US012323955B2

(12) United States Patent
Ryu et al.

(10) Patent No.: US 12,323,955 B2
(45) Date of Patent: Jun. 3, 2025

(54) DYNAMIC POSTPONEMENT OF PERIODIC RESOURCES AND DRX ACTIVE TIMES IN MODE 1 SIDELINK

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 17/648,664

(22) Filed: Jan. 21, 2022

(65) Prior Publication Data

US 2023/0239842 A1 Jul. 27, 2023

(51) Int. Cl.
*H04W 72/0446* (2023.01)
*H04W 52/02* (2009.01)
*H04W 88/04* (2009.01)
*H04W 92/18* (2009.01)

(52) U.S. Cl.
CPC ... *H04W 72/0446* (2013.01); *H04W 52/0216* (2013.01); *H04W 52/0229* (2013.01); *H04W 88/04* (2013.01); *H04W 92/18* (2013.01)

(58) Field of Classification Search
CPC ......... H04W 72/0446; H04W 52/0216; H04W 52/0229; H04W 88/04; H04W 92/18; H04W 76/23; H04W 76/28; Y02D 30/70

(Continued)

(56) References Cited

U.S. PATENT DOCUMENTS

2019/0174411 A1* 6/2019 Xu .......... H04W 52/02
2020/0267655 A1* 8/2020 Awoniyi-Oteri ............ H04W 52/0216

(Continued)

FOREIGN PATENT DOCUMENTS

WO 2022013446 A2 1/2022
WO 2022015015 A1 1/2022

OTHER PUBLICATIONS

Interdigital Inc., "Discussion on Potential Enhancements for Supporting XR", 3GPP TSG RAN WG1 #104-e, R1-2100573, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, 6 Pages, XP051971044, Jan. 19, 2021, chapter 2, see sections 2.3-2.4.

(Continued)

*Primary Examiner* — Michael Y Mapa
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for dynamic postponement of periodic resources and DRX active times. A first UE and a second UE may receive, from a base station, an allocation of periodic resources for reception of downlink traffic and relayed downlink traffic over sidelink. The first UE and the second UE may also receive respective postponement indications for reception occasions of the periodic resources and may monitor for the downlink traffic and the relayed downlink traffic at time adjusted instances in response to the respective postponement indications. A base station may send the downlink traffic to the first UE, which may relay the downlink traffic (Continued)

to the second UE, at the time adjusted instances in response to the postponement indications.

30 Claims, 19 Drawing Sheets

(58) Field of Classification Search
USPC ........ 370/311; 455/7, 41.1–41.2, 450–452.2, 455/464, 509
See application file for complete search history.

(56) References Cited

U.S. PATENT DOCUMENTS

| | | | |
|---|---|---|---|
| 2021/0314967 A1* | 10/2021 | Wang | ................ H04W 72/0453 |
| 2022/0287092 A1* | 9/2022 | Berggren | ............... H04W 16/14 |
| 2023/0084017 A1* | 3/2023 | Wang | .................... H04W 76/27 |
| | | | 370/311 |
| 2024/0333656 A1* | 10/2024 | Wang | ...................... H04L 47/70 |

OTHER PUBLICATIONS

International Search Report and Written Opinion—PCT/US2022/052794—ISA/EPO—May 2, 2023.
Vivo: "KI#1, New Sol: Network Assisted Power Efficient PC5 Communication for Pedestrian UEs", SA WG2 Meeting #140E, S2-2005235, 3rd Generation Partnership Project, Mobile Competence Centre, 650, Route Des Lucioles, F-06921 Sophia-Antipolis Cedex, France, vol. SA WG2, No. Electronic, Aug. 19, 2020-Sep. 1, 2020, Aug. 13, 2020, XP051920063, 4 Pages, sections Discussion and 6.x.1-6.x.2.

* cited by examiner

DYNAMIC POSTPONEMENT OF PERIODIC RESOURCES AND DRX ACTIVE TIMES IN MODE 1 SIDELINK

TECHNICAL FIELD

The present disclosure relates generally to communication systems, and more particularly, to wireless communication including periodic resources or discontinuous reception (DRX).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from a base station, an allocation of periodic resources for reception of downlink traffic and relay of the downlink traffic over sidelink to a second user equipment (UE); receive a first postponement indication from the base station for a reception occasion of the periodic resources; and monitor for the downlink traffic at a time adjusted instance in response to the first postponement indication.

In another aspect of the disclosure, a method, a computer-readable medium, and an apparatus are provided. The apparatus may receive an allocation of periodic resources for reception of relayed downlink traffic over sidelink from a first UE; receive a postponement indication from the first UE for a reception occasion of the periodic resources; and monitor for the relayed downlink traffic at a time adjusted instance in response to the postponement indication.

In yet another aspect of the disclosure, a method, a computer-readable medium, and an apparatus are provided. The apparatus may allocate periodic resources for a first UE to receive downlink traffic and relay the downlink traffic over sidelink to a second UE; send a postponement indication for a reception occasion of the periodic resources; and send the downlink traffic to the first UE at a time adjusted instance in response to the postponement indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
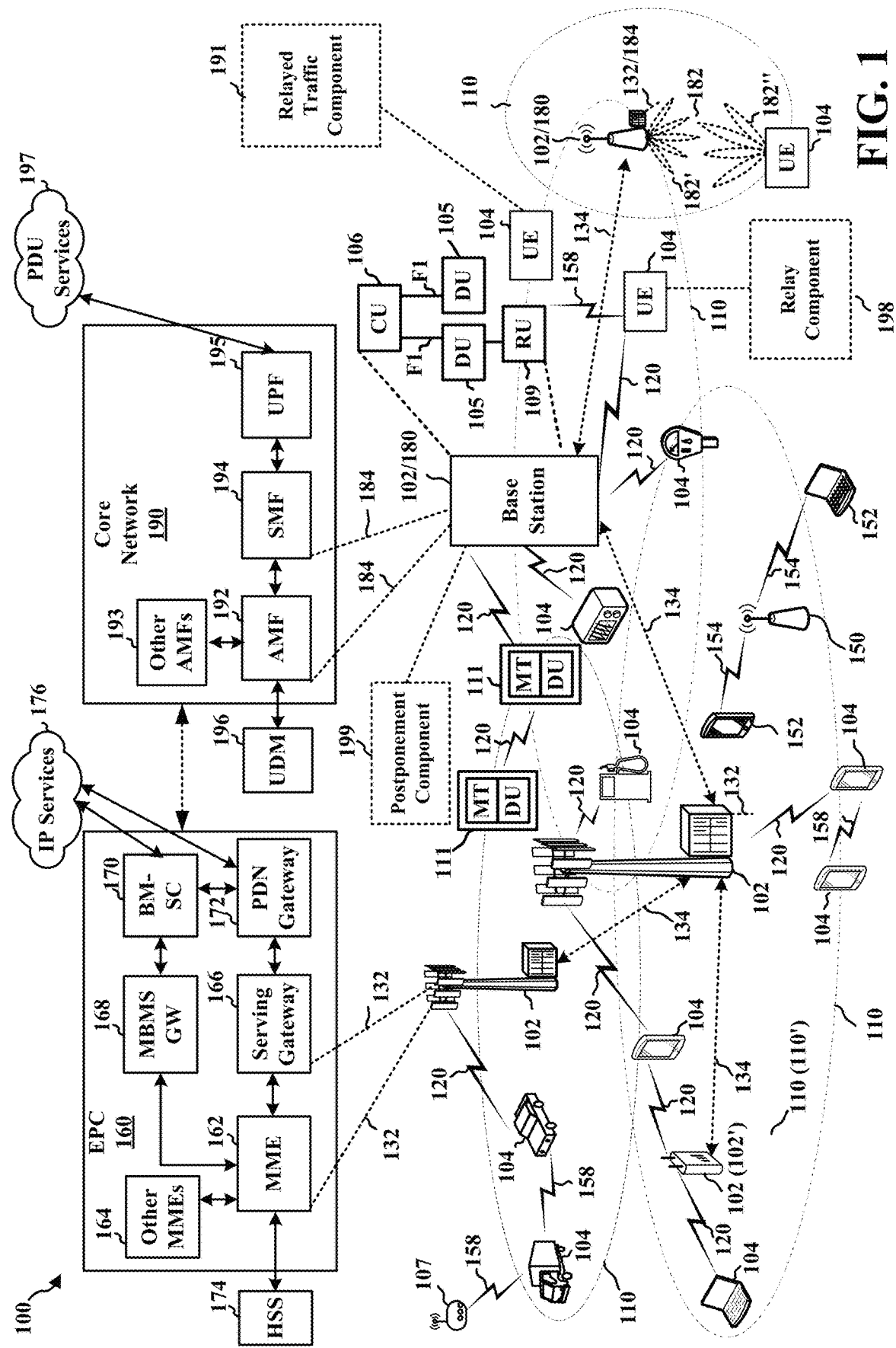
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 3.

Figure 2:
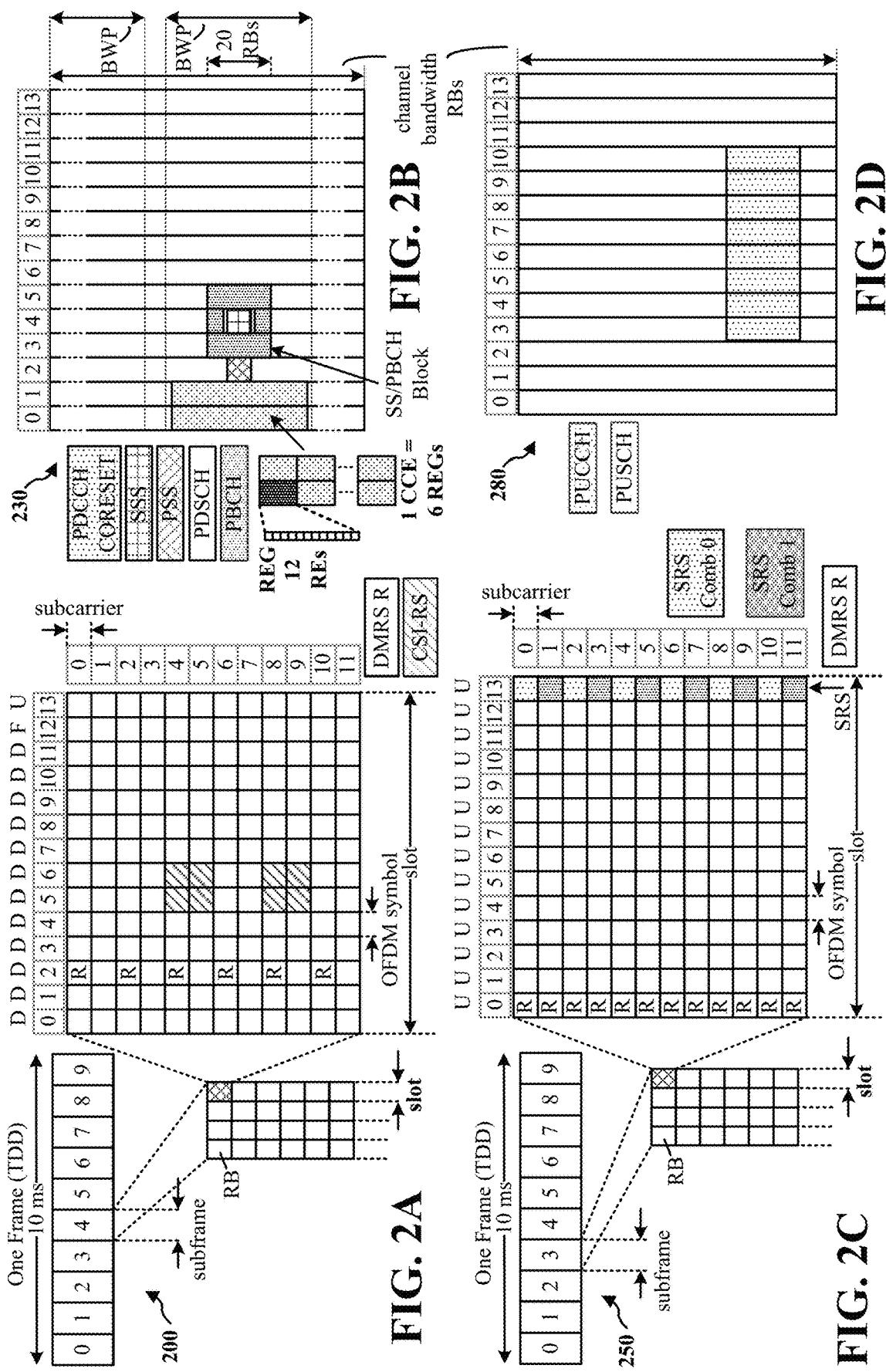
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user plane PDU session packets, e.g. IP, Ethernet, or unstructured packets, are transferred through the UPF 195. The UPF 195 provides UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. Connections between these devices may be Wi-Fi, Bluetooth, Sidelink, or other D2D communication technologies.

Referring again to FIG. 1, in certain aspects, the UE 104 (e.g., a first UE) may include a relay component 198 configured to receive, from a base station, an allocation of periodic resources for reception of downlink traffic and relay of the downlink traffic over sidelink to a second UE; receive a first postponement indication from the base station for a reception occasion of the periodic resources; and monitor for the downlink traffic at a time adjusted instance in response to the first postponement indication. In certain aspects, a second UE 104 may include a relayed traffic component 191 configured to receive an allocation of periodic resources for reception of relayed downlink traffic over sidelink from a first UE; receive a postponement indication from the first UE for a reception occasion of the periodic resources; and monitor for the relayed downlink traffic at a time adjusted instance in response to the postponement indication. In certain aspects, the base station 180 may include a postponement component 199 configured to allocate periodic resources for a first UE to receive downlink traffic and relay the downlink traffic over sidelink to a second UE; send a postponement indication for a reception occasion of the periodic resources; and send the downlink traffic to the first UE at a time adjusted instance in response to the postponement indication. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology ∞=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 19:
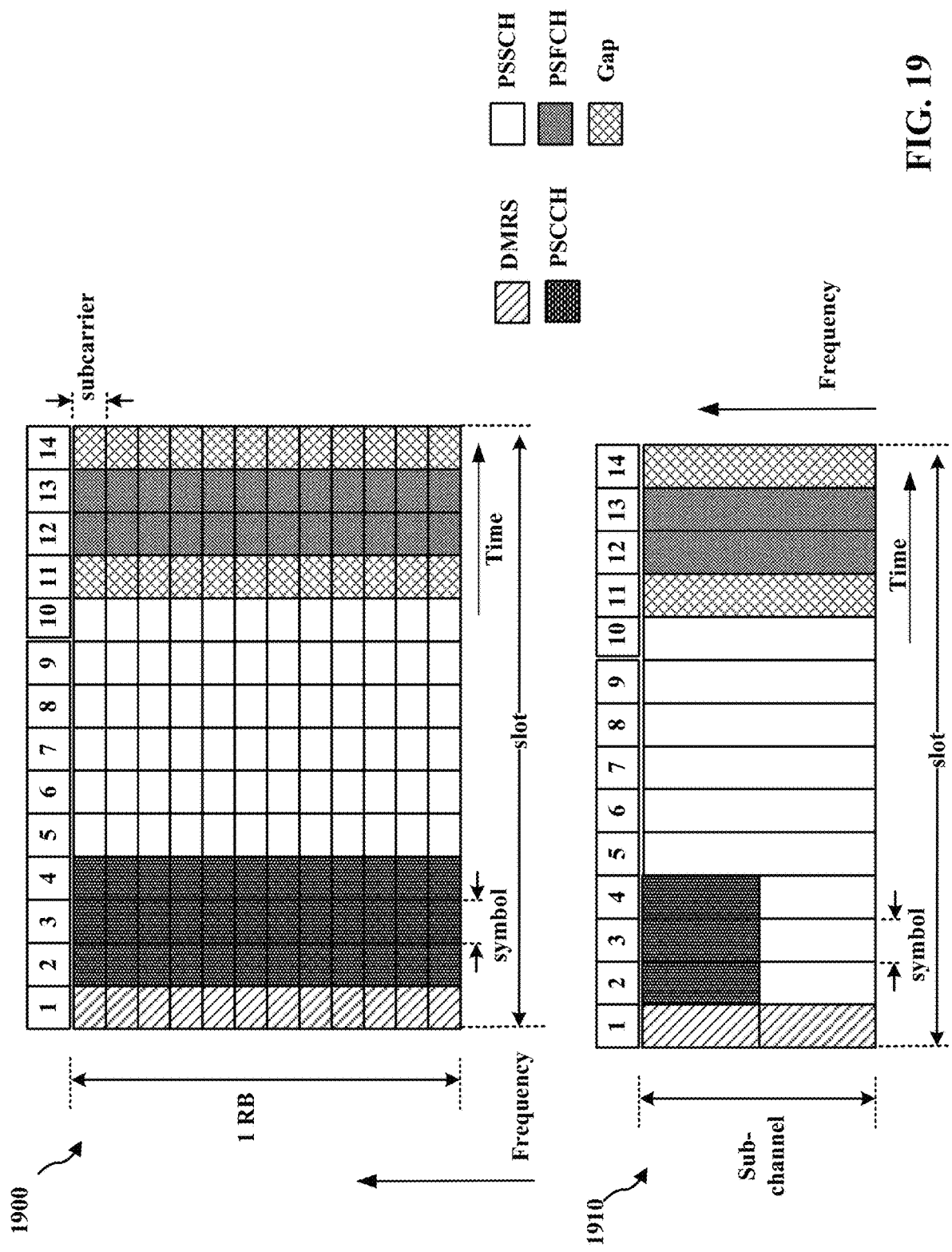
FIG. 19 illustrates example aspects of a sidelink slot structure.

FIG. 19 includes diagrams 1900 and 1910 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 19 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 1900 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 1910 in FIG. 19 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 19, some of the REs may include control information in PSCCH and some REs may include demodulation RS (DMRS). At least one symbol may be used for feedback. FIG. 19 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 19. Multiple slots may be aggregated together in some aspects.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources.

Figure 3:
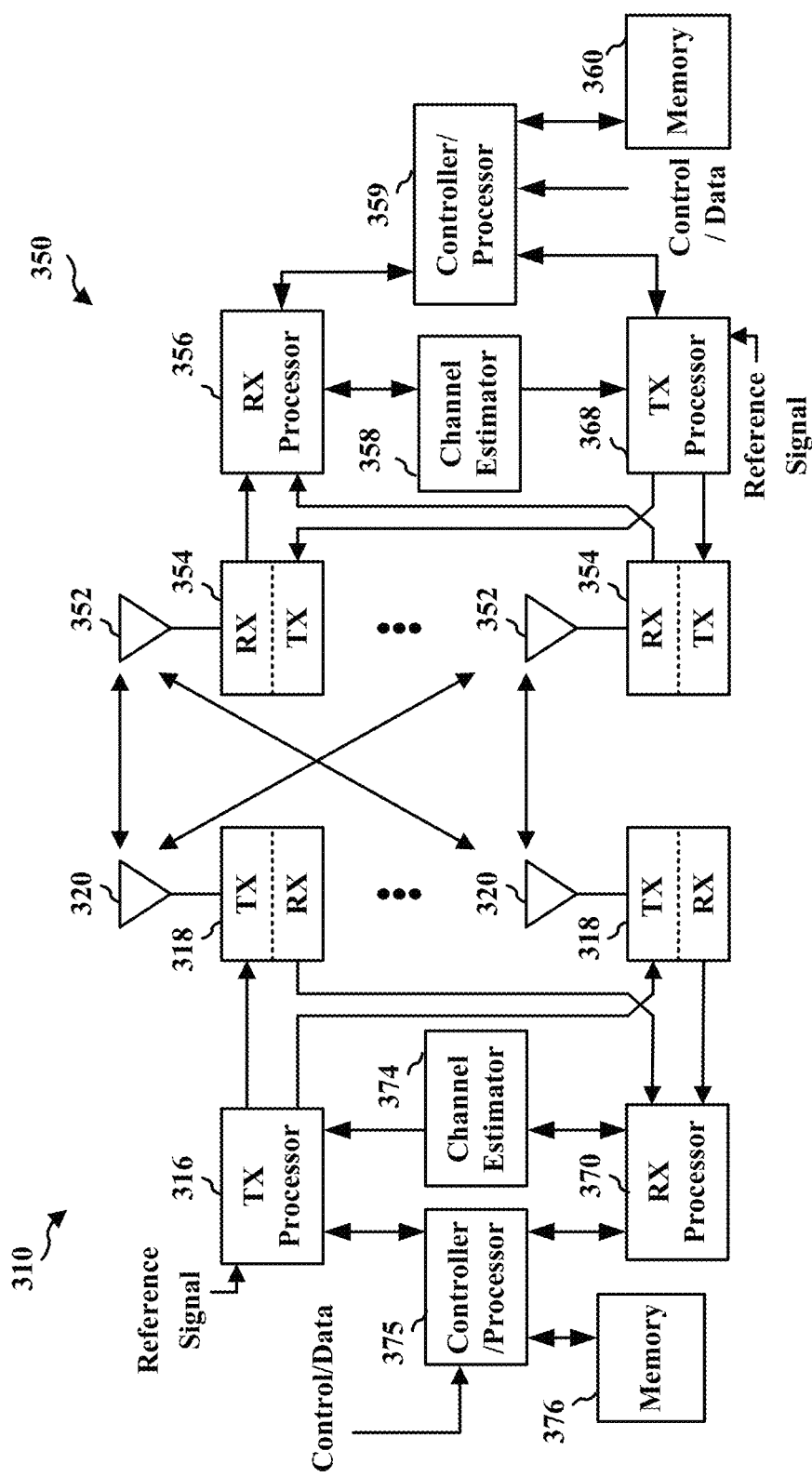
FIG. 3 is a diagram illustrating an example of a base station and user equipment (UE) in an access network.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. In some examples, the device 310 may be a base station or a component of a base station (e.g., 102 or 180) and the device 350 may be a UE (e.g., UE 104) in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the relayed traffic component 191 of FIG. 1.

At least one of the TX processor 368, the RX processor 356, and the controller/processor 359 may be configured to perform aspects in connection with the relay component 198 of FIG. 1.

At least one of the TX processor 316, the RX processor 370, and the controller/processor 375 may be configured to perform aspects in connection with the postponement component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
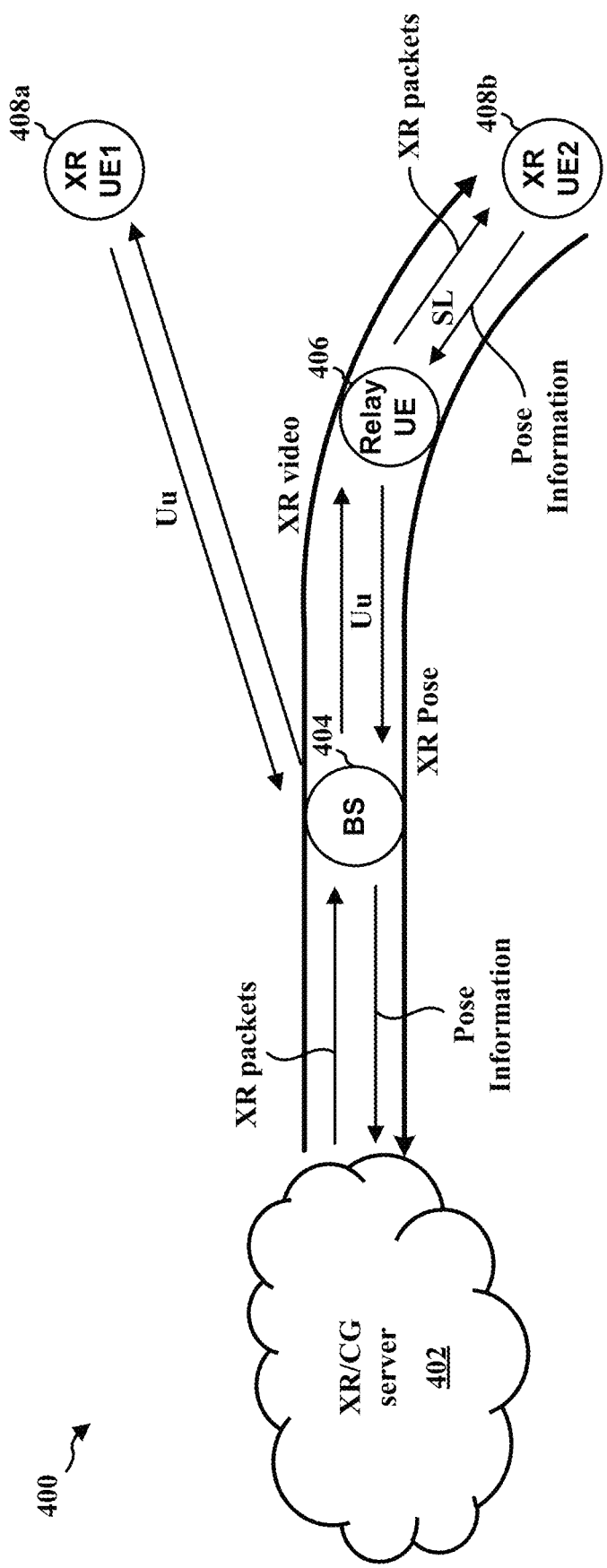
FIG. 4 is a diagram illustrating communications between extended reality (XR)/cloud gaming (CG) network entities.

In some aspects, a network may send data packets to a first UE for relay to a second UE. For example, the first UE may have an access link, or Uu link with a base station. The base station may send the data packets for the second UE as downlink traffic to the first UE. The first UE may then relay the data to the second UE over sidelink. Among other examples of relayed communication, FIG. 4 is a diagram 400 illustrating communications between extended reality (XR)/cloud gaming (CG) network entities. XR UEs, such as XR UE1 408a and XR UE2 408b, may be devices, such as head-mounted devices, that generate pose information indicative of an orientation of the XR UEs (e.g., XR UE1 408a and XR UE2 408b). The pose information may correspond to an XR pose for an XR/CG application. XR UE1 408a and XR UE2 408b may generate the pose information based on respective fields of view determined for users of XR UE1 408a and XR UE2 408b.

In a first example, XR UE2 408b may transmit the generated pose information to a relay UE 406 via sidelink, which may relay/forward the pose information to the base station 404 over a Uu communication link. Although only a single sidelink relay is illustrated, the pose information transmitted from XR UE2 408a may be relayed/forwarded to the base station 404 via a plurality of sidelink hops associated with a plurality of relay UEs, before the pose information is transmitted on uplink from a particular relay UE (e.g., the relay UE 406) to the base station 404 over the Uu communication link. In a second example, an XR UE, such as XR UE1 408a, may transmit the generated pose information directly to the base station 404 over the Uu communication link without an intervening relay UE. After the base station 404 receives the pose information from XR UE1 408a directly or from XR UE2 408b via the relay UE 406, the base station 404 may transmit the pose information to an XR/CG sever 402.

The XR/CG server 402 may periodically generate video/images to be displayed on one or more XR UEs, such as XR UE1 408a and/or XR UE2 408b. The video/images may be included in XR packets transmitted to the base station 404. Further, the video/images may be based on the pose information received by the XR/CG server 402. XR packets indicative of the video/image frames (e.g., XR video) may be transmitted from the XR/CG server 402 to XR UE1 408a via the base station 404 and/or to XR UE2 408b via the base station 404 and via the relay UE 406. XR UE1 408a and XR UE2 408b may display the video/images after receiving the XR packets indicated from the XR/CG server 402.

XR UEs may include head-mounted devices used for augmented reality (AR) applications, virtual reality (VR) applications, CG applications, etc. The pose information received by the XR/CG server 402 may be generated periodically by XR UE1 408a and/or XR UE2 508b. For example, XR UE2 408b may generate pose information every 100 ms to indicate a current orientation of XR UE2 408b (e.g., current orientation of a head-mounted device). Based on the pose information indicated by XR UE2 408b, the XR/CG server 402 may generate video/image frames to be transmitted back to XR UE2 408b for display.

The XR/CG server 402 may be in communication with a plurality of XR UEs, e.g., as illustrated in the diagram 400. Thus, the XR/CG server 402 may generate XR packets for each XR UE of the plurality of XR UEs. Based on a current processing load at the XR/CG server 402 (e.g., associated with the number of XR UEs connected to the XR/CG server 402), a computational complexity for generating the XR packets including the video/image frames for a particular XR UE, such as XR UE2 408b, may cause transmission of the XR packets from the XR/CG server 402 to the base station 404 to be delayed. That is, the XR/CG server 402 may not be able to transmit the XR packets including the video/image frames to the base station 404 during an allocated timeframe. Delayed transmission of the XR packets from the XR/CG server 402 may be associated with jitter at the XR/CG server 402.

A sidelink UE may be configured to relay downlink XR video information from the base station 404 to XR UE2 408b. Similarly, the sidelink UE (e.g., relay UE 406) may be configured to relay uplink XR pose information from XR UE2 408b to the base station 404. Hence, XR UE2 408b may be in communication with the relay UE 406 via sidelink, and the relay UE 406 may be in communication with the base station 404 via the Uu communication link. The base station 404 may forward the XR pose information received from the relay UE 406 to the XR/CG server 402 and/or forward the XR video information received from the XR/CG server 402 to the relay UE 406. The sidelink UE/relay UE 406 may be utilized in some examples to extend a coverage area for an XR/CG application.

Figure 5:
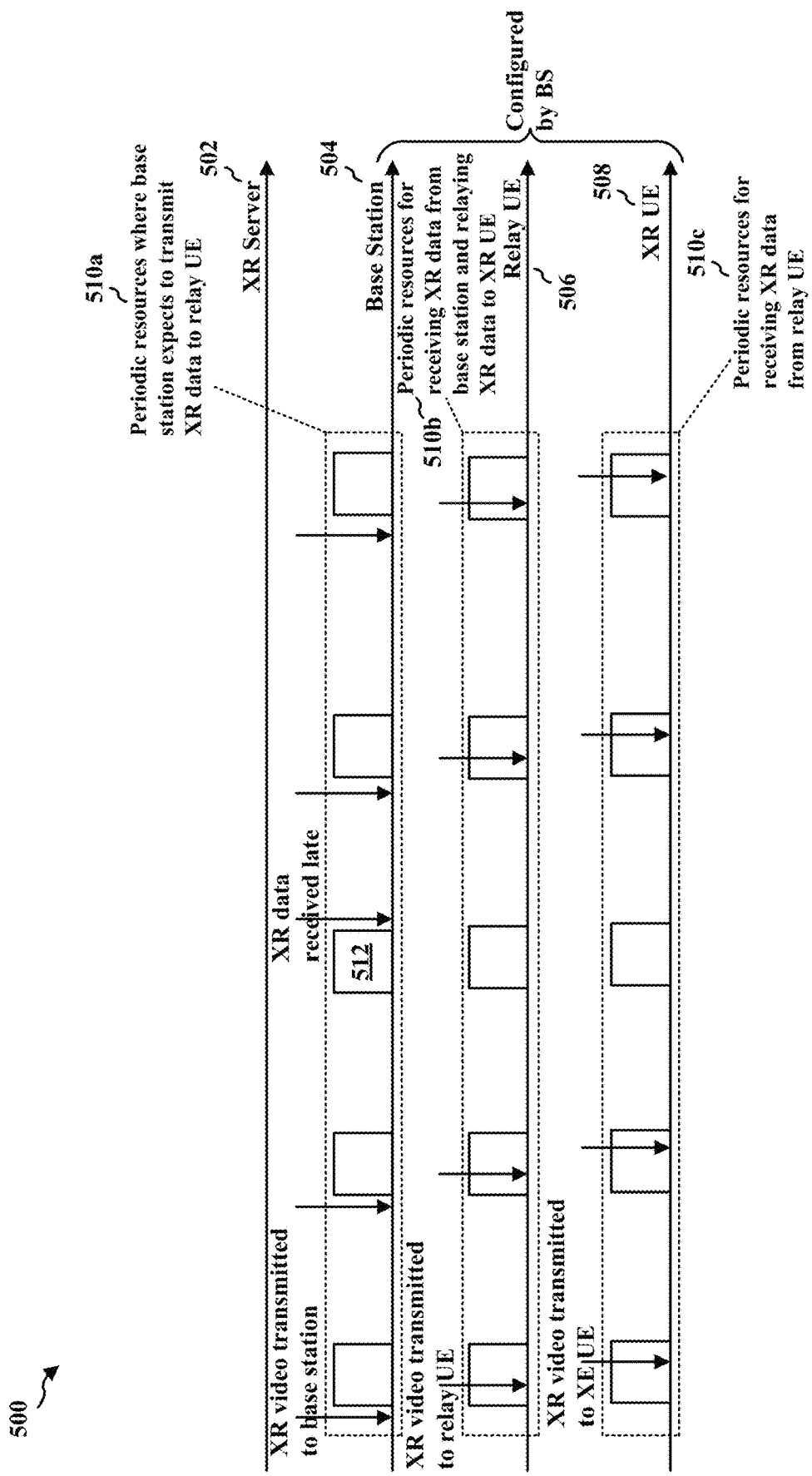
FIG. 5 is a diagram illustrating an allocation of resources for communicating video information from a server.

FIG. 5 is a diagram 500 illustrating an allocation of resources for communicating video information from a server (e.g., XR server 502). Downlink XR video information may be periodically generated by the XR server 502 and transmitted to the base station 504. Hence, the base station 504 may allocate a first set of periodic resource 510a for transmitting the XR video information received from the XR server 502, a second set of periodic resources 510b for XR video transmitted from the base station 504 to the relay UE 506, and a third set of periodic resources 510c for XR video transmitted from the relay UE 506 to the XR UE 508. The first set of periodic resources 510a may correspond to allocated times at which the base station 504 expects to transmit XR data to the relay UE 506 after receiving the XR data from the XR server 502. The second set of periodic resources 510b may correspond to allocated times for the relay UE 506 to receive the XR data from the base station 504 and transmit the XR data to the XR UE 508. The third set of periodic resources 510c may correspond to allocated times for the XR UE 508 to receive the XR data from the relay UE 506. In further examples, the periodic resources 510a-510c may be allocated for the XR UE 508, the relay UE 506, and the base station 504 to transmit uplink pose information from the XR UE 508 to the XR server 502.

An increased processing load (e.g., time-varying server load) at the XR server 502 may cause jitter in a sequence of video frames transmitted from the XR server 502 to the base station 504. "Jitter" refers to a deviation in a true transmission periodicity of the video frames from an otherwise periodic signal. As a result of the jitter caused at the XR server 502, the base station 504 may not receive the XR data from the XR server 502 prior to a start of a particular allocated instance 512 of the first set of periodic resources 510a. For example, the base station 504 may receive the XR data late from the XR server 502, such as after the particular allocated instance 512 of the first set of periodic resources 510a has concluded or near the end of the periodic resources 510a. Each allocated instance of the periodic resources 510a-510c may be allocated based on a size that balances resource waste and the ability to transmit/receive XR data, e.g., being small enough to reduce resource waste, but large enough to transmit/receive the XR data.

The resource allocation for the base station may be used by the base station to transmit the XR data to the relay UE. The resource allocation for the relay UE may be used by the relay UE to forward/relay the XR data from the base station to the XR UE. If the base station 504 is not able to transmit the XR data to the relay UE 506 (e.g., because the XR data was received too late from the XR server 502), the particular allocated instance 512 of the first set of periodic resources 510a may be associated with resource waste.

The periodic resource allocations associated with the first set of periodic resources 510a, the second set of periodic resources 510b, and the third set of periodic resources 510c may be configured by the base station 504 and associated with a plurality of transmission/reception occasions for the XR data communicated between the network entities. At a first transmission occasion the XR data may be received by the base station 504 from the XR server 502 prior to a start of an allocated resource of the base station 504. The base station 504 may utilize the first set of periodic resources 510a to transmit the XR data to the relay UE 506. For a subsequent transmission occasion, such as the particular allocated instance 512, the XR data may be received by the base station 504 after an allocated time for the subsequent transmission occasion has expired.

An increased processing load at the XR server 502 may cause transmission of the XR data to the base station 504 to be delayed. Thus, an allocated instance of the second set of periodic resources 510b associated with the relay UE 506 and/or an allocated instance of the third set of periodic resources 510c associated with the XR UE 508 may be wasted if the base station 504 is unable to transmit the XR data to the relay UE 506 on time. In some examples, the base station 504 may allocate further resources for the relay UE 506 to receive the XR data from the base station 504 after the XR data is received late by the base station 504 from the XR sever 502. In further examples, the base station 504 may wait until a next allocated instance of the first set of periodic resources 510a to transmit the XR data to the relay UE 506 after the XR data is received late by the base station 504 from the XR sever 502.

If the XR data is received during an allocated instance of the first set of periodic resources 510a, and not prior to a start of the allocated instance, a remaining portion of the allocated instance that follows reception of the XR data would have to be large enough to transmit the XR data to an intended network entity. For example, if the base station 504 receives the XR data from the XR server 502 at a first portion of the way through the allocated instance, the base station 504 may transmit the XR data to the relay UE 506 using the allocated instance if a second portion of the allocated instance that remains after the XR data is received from the XR server 502 is still large enough to transmit the XR data to the intended network entity. If the second portion of the allocated instance that remains after the XR data is received from the XR server 502 is not large enough to transmit the XR data, a first part of the XR data may be transmitted, but a second part of the XR data may not. While a larger resource allocation may allow for late data transmissions to still be transmitted within a particular instance, if the instances is unused a larger amount of resources goes unused. In order to improve the efficient use of periodic resources allocated for the transmission data of data for a second UE from a network to a first UE and the relay of the data from the first UE to the second UE, aspects presented herein provide for dynamic postponement of allocated resources.

Figure 6:
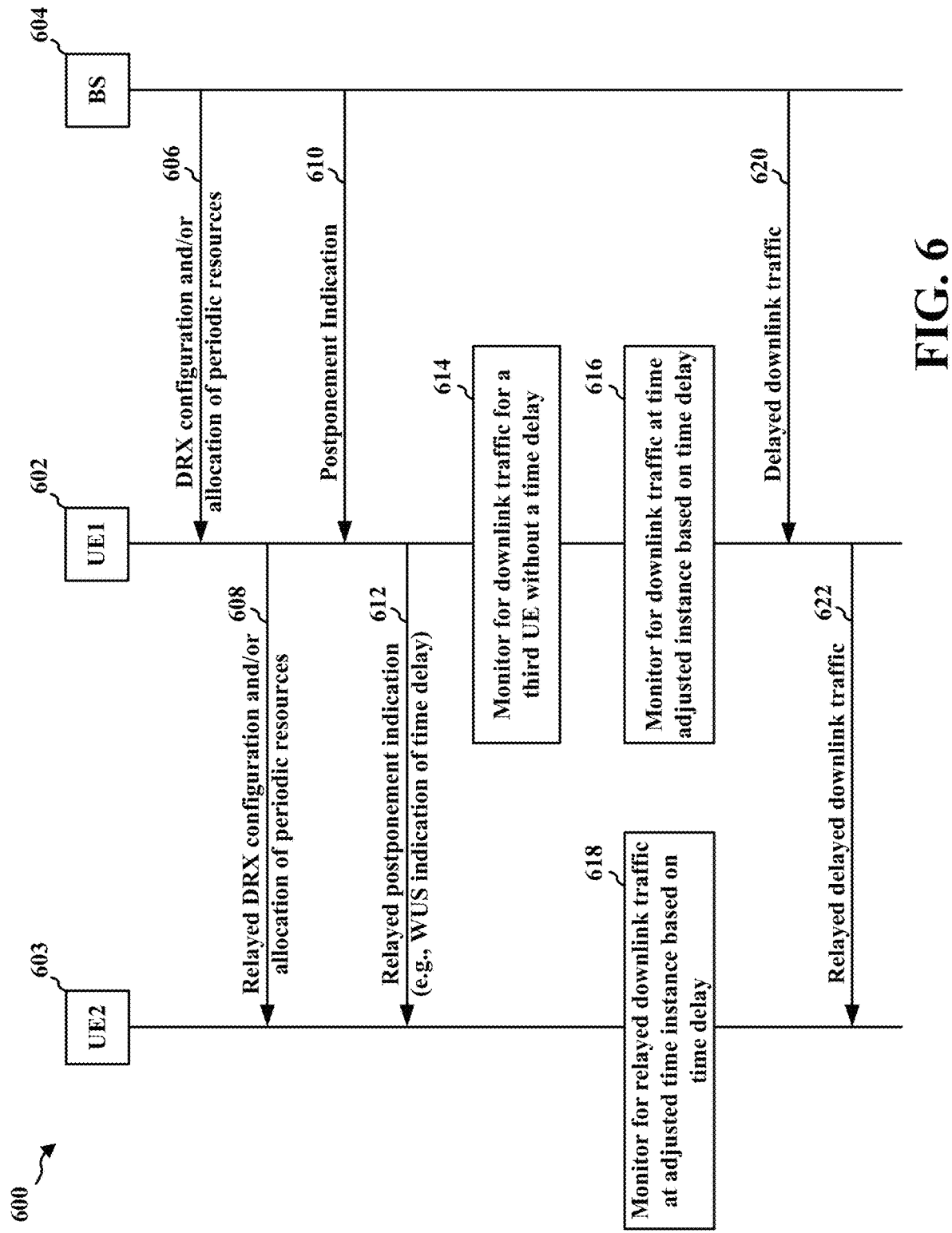
FIG. 6 is a call flow diagram illustrating communications between a first UE, a second UE, and a base station.

FIG. 6 is a call flow diagram 600 illustrating communications between a first UE 602, a second UE 603, and a base station 604. At 606, the base station 604 may transmit a discontinuous reception (DRX) configuration and/or an allocation of periodic resources to the first UE 602. In examples, the DRX configuration may include DRX active times, which may be referred to as ON durations, associated with periodic resources for communicating information between different network entities. At 608, the first UE 602 may relay the DRX configuration and/or the allocation of periodic resources to the second UE 603, such that the second UE 603 may use the relayed DRX configuration and/or the allocated periodic resources for communicating with the first UE 602.

At 610, the base station may transmit a postponement indication to the first UE 602. The postponement indication may be configured to postpone/delay one or more allocated instances of the periodic resources without postponing/delaying other allocated instances of the periodic resources. For example, the base station 604 may not receive a packet from a server at an expected time, but may determine that the packet is expected to be received with a certain delay. The postponement/delay of the one or more allocated instances of the periodic resources may correspond to the delay. At 612, the first UE 602 may relay the postponement indication to the second UE 603 to postpone/delay one or more instances of the periodic resources at the second UE 603 by a same delay time. In examples, the postponement indication may be communicated in a wake-up signal (WUS) indication of the time delay.

After the relayed postponement indication is transmitted, at 612, to the second UE 603, the first UE 602 may monitor, at 614, downlink traffic for a third UE without a time delay. While the delayed packet expected to be received by the base station 604 may be associated with the second UE 603, the base station 604 may receive other packets associated with other UEs on time. Thus, the base station 604 does not have to postpone/delay the periodic resources for communicating the other packets associated with the other UEs. However, at 616, the first UE 602 may monitor for downlink traffic (e.g., associated with the first UE 602 and/or the second UE 603) at a time instance that is adjusted/delayed based on the time delay associated with the postponement indication. At 618, the second UE 603 may similarly monitor for relayed downlink traffic at the time instance that is adjusted/delayed based on the time delay associated with the postponement indication.

At 620, the base station 604 may transmit delayed downlink traffic to the first UE 602 after receiving the delayed downlink traffic from the server. At 622, the first UE 602 may transmit relayed/delayed downlink traffic to the second UE 603. The delay in the downlink traffic received by the first UE 602 and the second UE 603 may correspond to the time delay indicated via the postponement indication.

Figure 7:
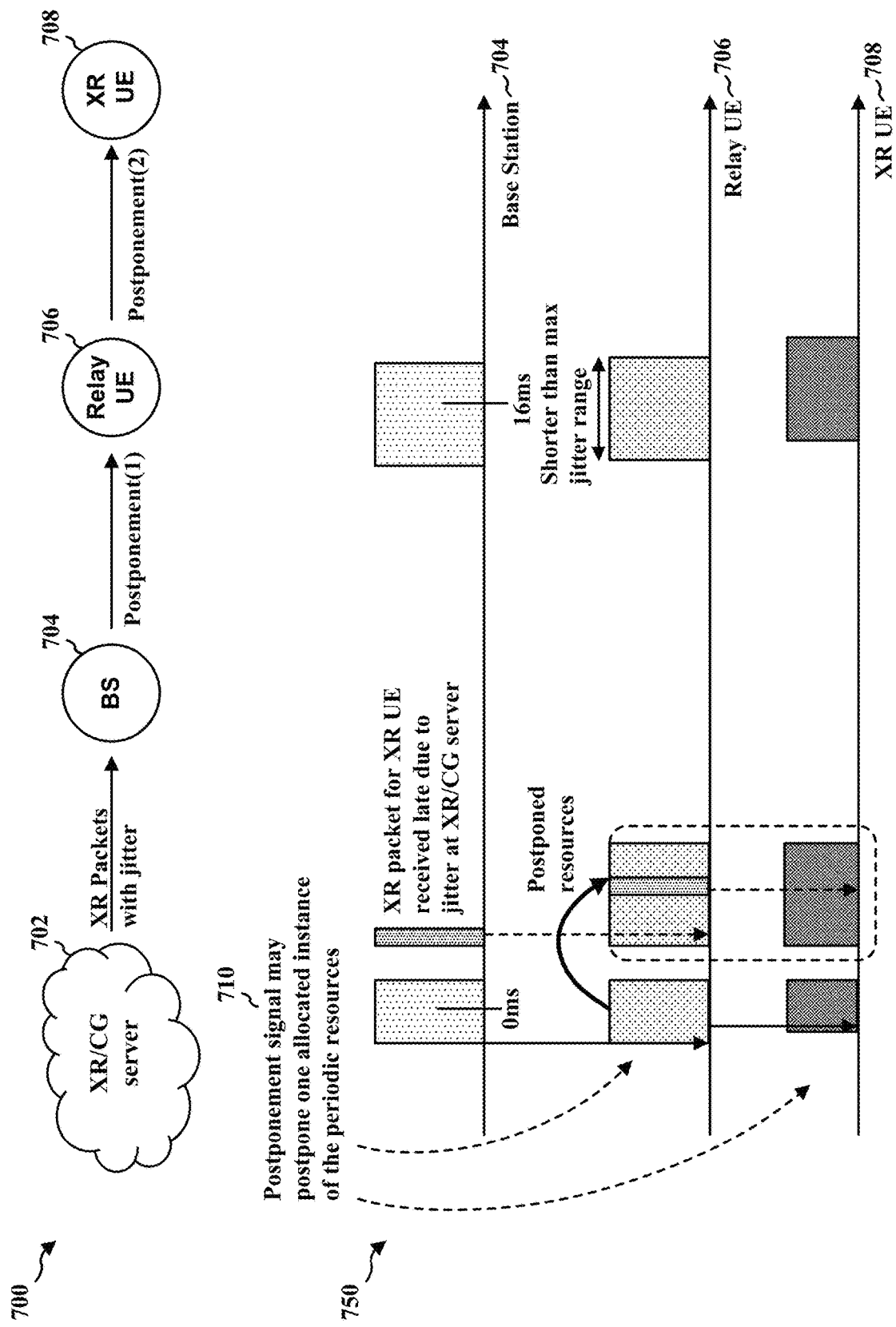
FIG. 7 includes diagrams illustrating dynamic postponement of allocated resources.

FIG. 7 includes diagrams 700-750 illustrating aspects of dynamic postponement of allocated resources. For example, the allocated resources may be postponed/delayed based on a postponement signal 710 transmitted by the base station 704. In the diagram 700, due to XR packets associated with jitter, the base station 704 may not receive one or more XR data packets from the XR/CG server 702 to transmit XR data at a start of an allocated instance of the first set of periodic resources associated with the base station 704. Thus, the base station 704 may transmit a first postponement signal to the relay UE 706 to postpone a corresponding allocated instance of the second set of periodic resources associated with the relay UE 706. Based on receiving the first postponement signal from the base station 704, the relay UE 706 may transmit a second postponement signal to the XR UE 708 to postpone a further corresponding allocated instance of the third set of periodic resources associated with the XR UE 708. In some examples, such as illustrated in the diagram 750, the base station 704 may transmit the postponement signal directly to the XR UE 708.

While the base station 704 may expect to receive video information (e.g., one or more XR packets) from the XR/CG server 702 prior to a beginning of each allocated instance of the first set of periodic resources, the base station 704 may not actually receive such information at the expected time. For example, an XR packet for the XR UE 708 may be received late by the base station 704 due to jitter at the XR/CG server 702. Instead of the base station 704 remaining idle by continuing to wait for the XR packet from the XR/CG server 702, the base station 704 may transmit the postponement signal 710 to the relay UE 706 after the base station 704 determines that the XR packet has not arrived on time. The postponement signal 710 may be configured to postpone/delay one allocated instance of the periodic resources associated with each of the relay UE 706 and the XR UE 708, which may have been previously allocated by the base station 704. The base station 704 may then transmit the XR data to the relay UE 706 based on a delayed reception of the XR packet from the XR/CG server 702.

The postponement signal 710 may indicate for the UE to shift/delay the one allocated instance of the previously allocated resources by 10-20 ms in some examples. Referring again to the diagram 700, after receiving the first postponement signal from the base station 704, the relay UE 706 may similarly transmit/forward a postponement indication (e.g., second postponement signal) to one or more XR UEs, such as the XR UE 708, so that the one or more XR UEs may also shift/delay one allocated instance of the previously allocated resources based on the delay transmission of the XR data from the base station 704. The postponement signal 710 may postpone a next allocated instance of the periodic resources at both the relay UE 706 and the XR UE 708, but may not postpone all of the allocated instances of the periodic resources. Hence, a first subset of the allocated resources may correspond to postponed resources and a second subset of the allocated resources may correspond to non-postponed resources. The allocated resources at the base station 704, the relay UE 706, and the XR UE 708 may be postponed/shifted in time, so that a starting time of the postponed resources may provide the base station 704 with additional time to receive delayed XR packets from the XR/CG server 702.

Postponement of the periodic resources may also be for a plurality of the allocated instances of the periodic resources. For example, postponement of the periodic resources may be applied to all subsequent allocation instances of the periodic resources. In further examples, rather than postponing the one or more allocated instances of periodic resources, the postponement signal 710 may be used to advance the one or more allocated instances of the periodic resources to an earlier time. That is, the postponement signal 710 may be used to start a next allocated instance of the periodic resources earlier than the next allocated instance was previously scheduled. A corresponding advancement of one or more allocated instances of the periodic resources to an earlier time may also be performed for the second set of periodic resources associated with the relay UE 706 and/or the third set of periodic resources associated with the XR UE 708.

The postponement signal 710 may be used to vary the periodicity of the periodic resources over time (e.g., temporarily or for all of the subsequent resource allocation instances). For example, the periodicity of the periodic resources may be adjusted from 16 ms to a smaller or larger periodicity. Rather than postponing/delaying the one or more allocated instances of the periodic resources, the postponement signal 710 may be used in some examples to increase/extend a duration of the one or more allocated instances of the periodic resources. For example, the postponement signal 710 may be used to increase the duration of one or more subsequent allocation instances of the periodic resources if the duration is shorter than a maximum jitter range. The postponement signal 710 may allow the allocated instances of the periodic resources to be maintained at a small enough duration that is still large enough to receive the XR packets associated with the jitter.

Figure 8:
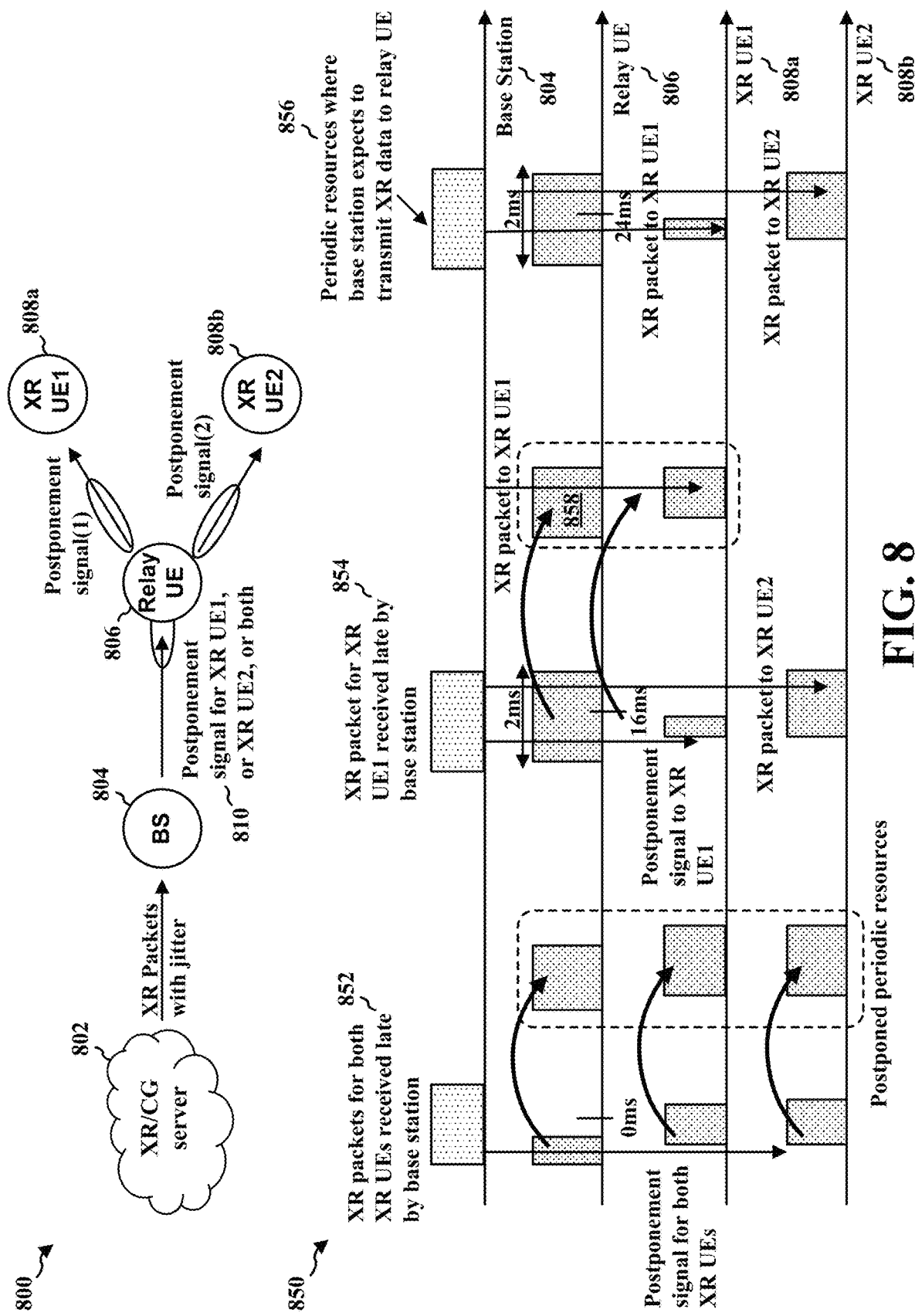
FIG. 8 includes diagrams illustrating dynamic postponement of allocated resources for a plurality of XR UEs.

FIG. 8 includes diagrams 800-850 illustrating dynamic postponement of allocated resources for a plurality of XR UEs. Referring to the diagram 800, due to XR packets associated with jitter, the base station 804 may not receive one or more packets from the XR/CG server 802 in order to transmit XR data at a start of an allocated instance of the first set of periodic resources associated with the base station 804. Thus, the base station 804 may transmit a postponement signal 810 to the relay UE 806 to postpone/delay a corresponding allocated instance of the second set of periodic resources associated with the relay UE 706. The postponement signal 810 may be indicative of postponement information for XR UE1 808*a*, XR UE2 808*b*, or both XR UEs. For example, the network may individually indicate a time delay for one of multiple UEs that are served by a particular relay UE.

Based on receiving the postponement signal 810 from the base station 804, the relay UE 806 may transmit/forward a first postponement signal to XR UE1 808*a* and/or a second postponement signal to the XR UE2 808*b*. The first/second postponement signals transmitted by the relay UE 806 may be configured to postpone one or more further corresponding allocated instances of a third set of periodic resources associated with XR UE1 808*a* and/or a fourth set of periodic resources associated with XR UE2 808*b*. That is, allocated instances of the periodic resources associated with XR UE1 808*a* and XR UE2 808*b* may be postponed based on the postponement signal 810 received by the relay UE 806 from the base station 804.

In some examples, the relay UE 806 may selectively forward the postponement signal 810 to some XR UEs and not forward the postponement signal 810 to other XR UEs. For example, the relay UE 806 may transmit the first postponement signal to XR UE1 808*a*, but may not transmit the second postponement signal to XR UE2 808*b*. Periodic resources associated with XR UEs that do not receive postponement information from the relay UE 806 may not be delayed/postponed. The relay UE 806 may be expected to transmit XR data to non-postponed XR UEs based on a previous resource allocation. For XR UEs that receive postponement information for the periodic resources, the relay UE 806 may be expected to transmit/forward downlink XR data to the postponed XR UEs based on the postponed resources.

The diagram 850 illustrates a first example 852 where the XR packets for both of the XR UEs (e.g., XR UE1 808*a* and XR UE2 808*b*) are received late by the base station 804. Hence, the base station 804 transmits a postponement signal 810 for the relay UE 806 to forward to both of the XR UEs (e.g., XR UE1 808*a* and XR UE2 808*b*). The periodic resources for the relay UE 806, XR UE1 808*a*, and XR UE2 808*b* may each be postponed based on the postponement signal 810 transmitted by the base station 804.

The diagram 850 illustrates a second example 854 where the XR packet for XR UE1 808*a* is received late by the base station 804, but the XR packet for XR UE2 808*b* is received on time by the base station 804. Hence, the base station 804 may transmit a postponement signal 810 for the relay UE 806 to forward to XR UE1 808*a*, but not forward to XR UE2 808*b*. Instead, the base station 804 may transmit the packet to XR UE2 808*b* via the relay UE 806 using the previously allocated instances of the periodic resources. In order to transmit the XR packet to XR UE1 808*a*, the base station 804 may allocate additional resources 858 to the relay UE 806 associated with a delayed reception time of the XR packet for XR UE1 808*a*. The postponement signal 810 may be used to postpone/delay an allocated instance of the periodic resources for XR UE1 808*a*, so that XR UE1 808*a* may receive the XR packet for XR UE1 808*a* from the base station 804 via the relay UE 806.

The diagram 850 illustrates a third example 856 including periodic resources where the base station 804 expects to transmit XR data to the relay UE 806, after receiving the XR data from the XR/CG server 802. That is, the third example 856 may correspond to cases where both the XR packet for XR UE1 808*a* and the XR packet for XR UE2 808*b* are received on time by the base station 804 from the XR/CG server 802. Allocated instances of the periodic resources associated with the base station 804 and the relay UE 806 may have long enough durations to transmit the XR packet to XR UE1 808*a* and the XR packet to XR UE2 808*b* in single allocated instances associated with the base station 804 and the relay UE 806. Thus, the base station 804 may transmit the XR packets to XR UE1 808*a* and XR UE2 808*b* via the relay UE 806 without transmitting a postponement signal 810.

Figure 9:
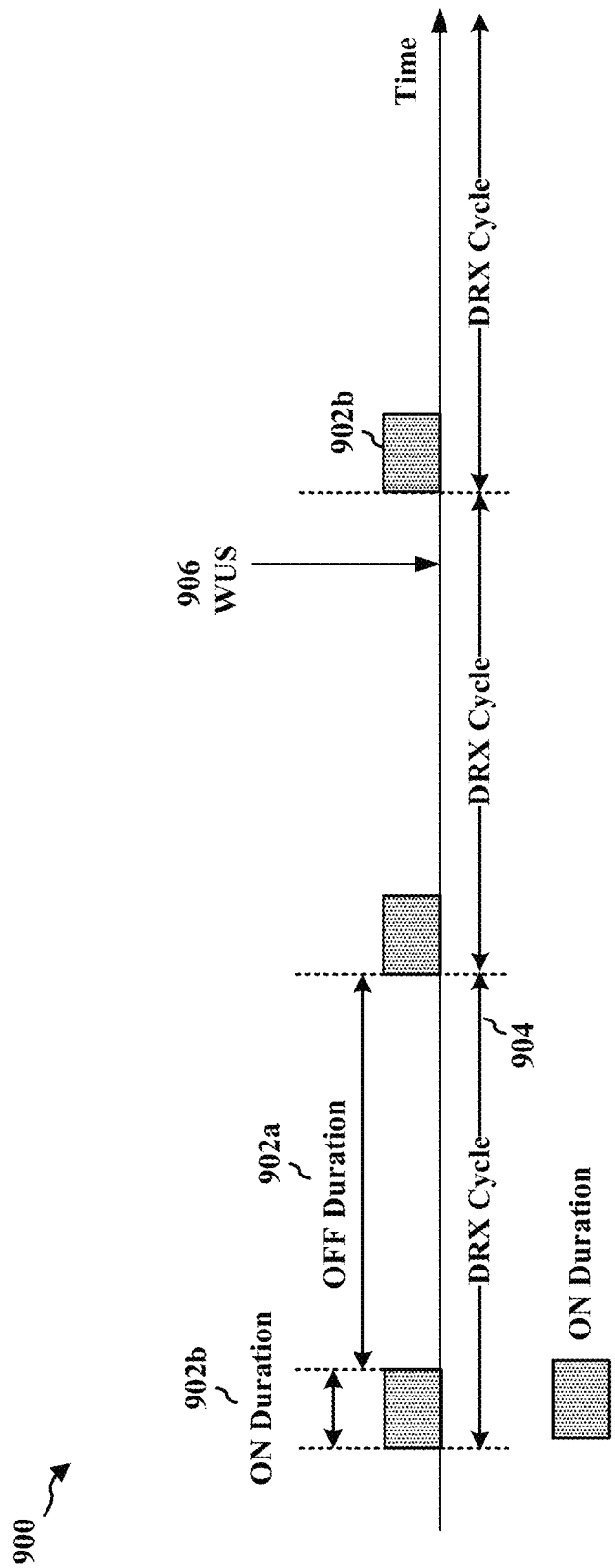
FIG. 9 is a diagram that illustrates a discontinuous reception (DRX) cycle.

FIG. 9 is a diagram 900 that illustrates a DRX cycle 904. A UE may conserve power based on DRX. In some aspects, the UE may be configured by a base station for DRX. During an RRC connected state, when there is no data transmission in either the uplink direction or the downlink direction, the UE may operate using a DRX mode. In the DRX mode, the UE may monitors for communication, such as a PDCCH, discontinuously using a "sleep" mode and a "wake up" cycle, which may be referred to as an OFF duration 902*a* and an ON duration 902*b*. At total time for the ON duration 902*b* and the OFF duration 902*a* may correspond to a DRX cycle 904. When the UE is in the RRC connected state, the DRX may also be referred to as Connected Mode DRX (C-DRX). DRX may conserve battery power at the UE. As an example, in a non-DRX mode, the UE may monitor for PDCCH in each subframe to check whether downlink data is available. Continuous monitoring of the PDCCH may consume more battery power at the UE.

The UE may receive a DRX configuration from the network in RRC signaling via the base station, such as in an RRC Connection Setup request or an RRC connection reconfiguration request. A DRX configuration may include the configuration of one or more timers and values. In some examples, the DRX configuration may include any of an ON duration Timer, a DRX inactivity timer, a DRX retransmission timer, a DRX uplink retransmission timer, a long DRX cycle, a value of the DRX start offset, a DRX short cycle timer, and/or a short DRX cycle, amongst others. A DRX cycle 904 may include a periodic repetition of an ON duration 902b in which the UE monitors for PDCCH from the base station and an OFF duration 902a. The diagram 900 illustrates an example of a DRX cycle 904 including a periodic ON duration 902b during which the UE monitors for PDCCH and an OFF duration 902a during which the UE may not monitor for the PDCCH. The OFF duration 902a may be referred to as a DRX opportunity. During the OFF duration 902a, the UE does not monitor for PDCCH. The UE may enter the sleep mode or a low power mode in which the UE may reduce power consumption by shutting down an RF function without detecting communication from the base station.

The ON duration timer may correspond to a number of consecutive PDCCH subframes to be monitored or decoded when the UE wakes up from the OFF duration 902a in the DRX cycle 904. The DRX retransmission timer may correspond to a consecutive number of PDCCH subframes for the UE to monitor when a retransmission is expected by the UE. The DRX inactivity timer may correspond to an amount of time before the UE may again enter the OFF duration 902a following successful decoding of the PDCCH. The amount of time may be in terms of a transmission time interval (TTI) duration. After a UE successfully receives downlink data, the DRX Inactivity Timer may start counting a number of subframes. If any uplink or downlink data transmissions occur while the DRX inactivity timer is running, the timer may restart. If the DRX inactivity timer expires without uplink or downlink activity, the UE may enter the DRX cycle 904 to achieve power savings.

The diagram 900 illustrates that a UE may monitor for a WUS 906 prior to an ON duration 902b. If the UE does not receive a WUS 906, or the WUS 906 does not indicate that there is information to be communicated to the UE in the ON duration 902b, the UE may skip waking up to monitor for communication during the ON duration 902b. If the UE receives a WUS 906 from the base station, the UE may wake up during the ON duration 902b to monitor for signaling from the base station.

In some aspects, a UE may use a DRX mode for sidelink communication. The DRX mode for sidelink communication may include periodic DRX ON durations and periodic DRX OFF durations, such as described in connection with the diagram 900. During the periodic DRX ON durations, the UE may monitor for sidelink communications or transmit sidelink communications. During the periodic DRX OFF durations, the UE may skip monitoring for sidelink communications and skip transmitting sidelink communications. In some aspects, the UE may monitor for a sidelink WUS (e.g., similar to the WUS 906) before the periodic DRX ON durations.

Figure 10:
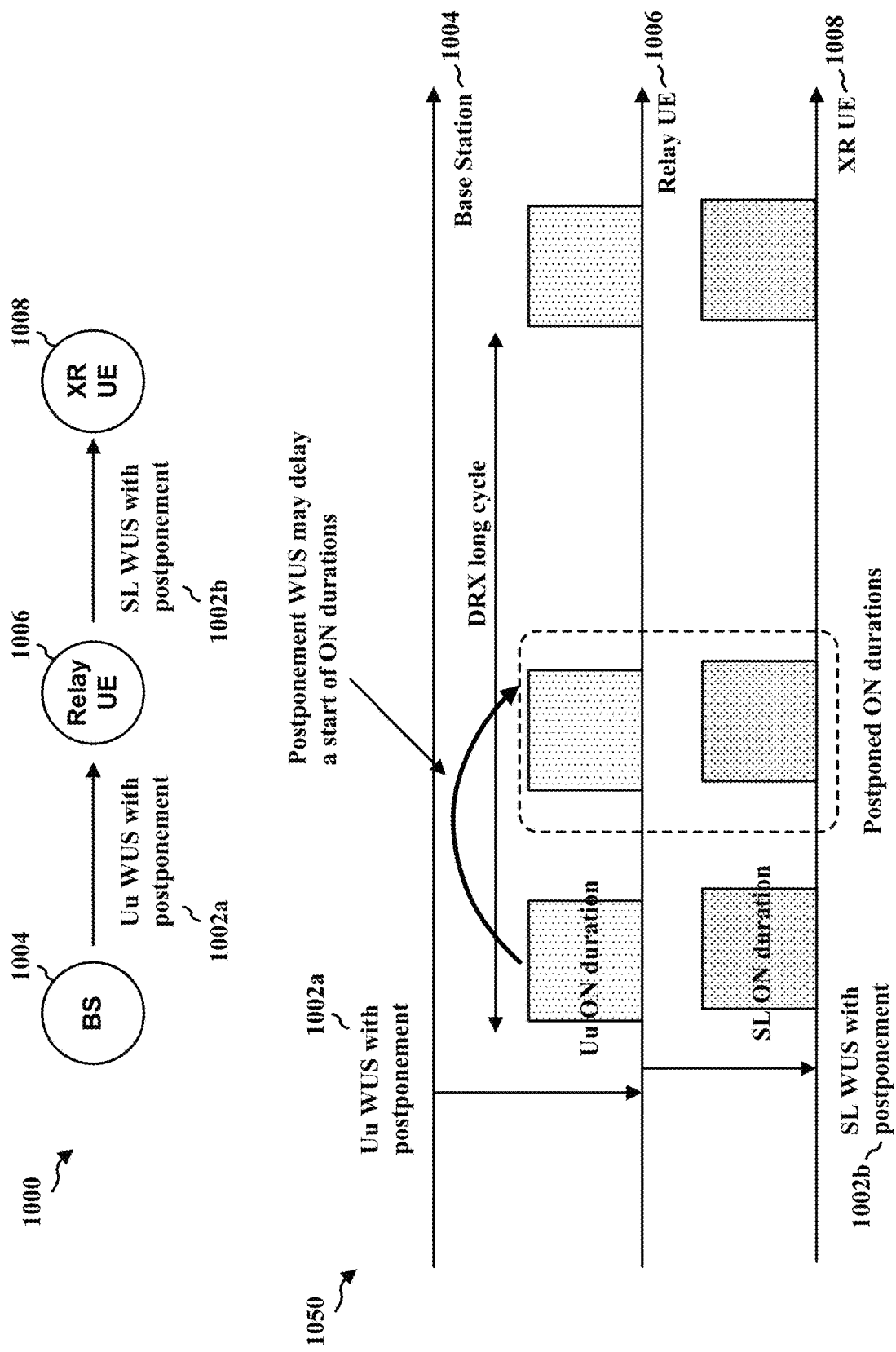
FIG. 10 is a diagram illustrating dynamic postponement of DRX active times.

FIG. 10 includes diagrams 1000-1050 illustrating dynamic postponement of DRX active times. DRX may be associated with a sequence of active times and inactive times at the XR UE 1006 and/or UE 1008. In examples, a DRX active time may be referred to as an ON duration time, and a DRX inactive time may be referred to as an OFF duration time. In the diagram 1000, the base station 1004 may transmit a Uu WUS 1002a including postponement information to the relay UE 1006. The relay UE 1006 may then forward/relay the postponement information to the XR UE 1008 via a sidelink WUS 1002b.

The postponement signal (e.g., 1002a-1002b) may be used to adjust one or more DRX active times at the relay UE 1006 and the XR UE 1008. During DRX inactive times, a receiver of the relay UE 1006 and a receiver of the XR UE 1008 may be switched off. For example, the relay UE 1006 and the XR UE 1008 may be in a "sleep" mode to save power. During DRX active times, the receiver of the relay UE 1006 and the receiver of the XR UE 1008 may be switched on and actively listening/monitoring for signals from the base station 1004 and the relay UE 1006, respectively.

In examples, the postponement signal (e.g., 1002a-1002b) may be transmitted during the DRX active times. A DRX configuration may include a DRX long cycle, where the DRX long cycle may include the DRX active times and a remainder of the long cycle may correspond to a DRX inactive time (e.g., where the receiver of the relay UE 1006 and the receiver of the XR UE 1008 may be switched off). The postponement signal (e.g., 1002a-1002b) may be used to shift the DRX active times by a certain amount in time. For example, the Uu WUS 1002a may be used to postpone/delay a start of a Uu ON duration time and the sidelink WUS 1002b may be used to postpone/delay a start of a sidelink ON duration time, where postponed ON durations may occur within the DRX long cycle.

The base station 1004 may configure the DRX active times at both the relay UE 1006 and the XR UE 1008, or the DRX active time may already be configured at the relay UE 1006 and the XR UE 1008, such that the base station 1004 may transmit a postponement signal (e.g., 1002a) to the relay UE 1006, which may postpone the active time associated with the Uu link. The active time may correspond to a length of time that the relay UE 1006 is monitoring for a signal from the base station 1004. When the base station 1004 transmits the postponement signal (e.g., 1002a) to the relay UE 1006, the active time associated with the Uu link may be postponed by a certain amount time. The relay UE 1006 may forward a postponement WUS (e.g., 1002b) via sidelink to one or more XR UEs, such as the XR UE 1008, so that a sidelink active time at the one or more XR UEs may also be postponed/delayed by a same amount of time as the postponement/delay at the relay UE 1006. The active times at the relay UE 1006 and the XR UE 1008 may be postponed/delayed by the same amount of time in order to align the active times of the relay UE 1006 with the active times of the XR UE 1008 based on a DRX configuration.

If downlink XR data packets do not arrive on time at the base station 1004 (e.g., due to jitter) for transmission of the downlink XR data by the base station 1004 during a next active time, the base station 1004 may transmit the Uu WUS 1002a to the relay UE 1006 to postpone the next active time. Postponing DRX active times using the Uu WUS 1002a may be performed in a similar manner to postponing an allocated instance of the periodic resources. The relay UE 1006 may forward the postponement information in the sidelink WUS 1002b to the XR UE 1008, which may delay a start of the next active time at both the relay UE 1006 and the XR UE 1008. The delay may be for one occurrence of the active time or for a plurality of occurrences of subsequent active times. Thus, a DRX offset may be temporarily adjusted for a current DRX cycle, rather than permanently adjusting the DRX offset for all subsequent DRX cycles. In further examples, the postponement signal (e.g., 1002a-1002b) may also be used to advance DRX active times to an earlier time in a similar manner to advancing an allocated instance of the periodic resources.

Figure 11:
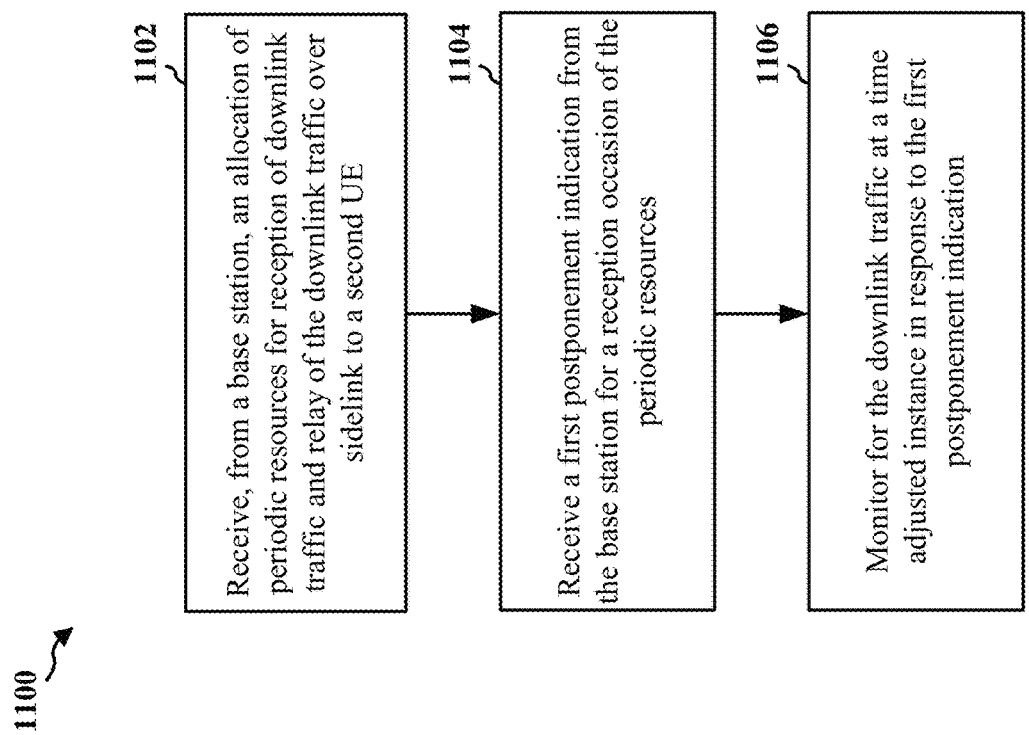
FIG. 11 is a flowchart of a method of wireless communication at a first UE.

FIG. 11 is a flowchart 1100 of a method of wireless communication. The method may be performed by a first UE (e.g., the UE 104, 406, 506, 602, 706, 806, 1006; the apparatus 1702; etc.), which may include the memory 360 and which may be the entire UE 104, 406, 506, 602, 706, 806, 1006 or a component of the UE 104, 406, 506, 602,

706, 806, 1006, such as the TX processor 368, the RX processor 356, and/or the controller/processor 359. The method may be performed to reduce resource waste associated with periodic resources.

At 1102, the first UE may receive, from a base station, an allocation of periodic resources for reception of downlink traffic and relay of the downlink traffic over sidelink to a second UE. For example, referring to FIGS. 5-8, the first UE 602 may receive, at 606, an allocation of periodic resources from the base station 604, such that the first UE 602 may receive downlink traffic (e.g., at 620) from the base station 604 and relay (e.g. at 622) the downlink traffic to the second UE 603. In the diagrams 500 and 700-800, the second set of periodic resources (e.g., 510*b*) may be allocated to the relay UE 506, 706, 806 by the base station 504, 704, 804. The reception, at 1102, may be performed by the allocation component 1742 of the apparatus 1702 in FIG. 17.

At 1104, the first UE may receive a first postponement indication from the base station for a reception occasion of the periodic resources. For example, referring to FIGS. 6-8, the first UE 602 may receive, at 610, a postponement indication from the base station 604. In the diagrams 700-800, the relay UE 706/806 may receive the postponement signal 710/810 from the base station 704/804. The reception, at 1104, may be performed by the postponement component 1744 of the apparatus 1702 in FIG. 17.

At 1106, the first UE may monitor for the downlink traffic at a time adjusted instance in response to the first postponement indication. For example, referring to FIG. 6, the first UE 602 may monitor, at 616, for downlink traffic at an adjusted time instance based on the time delay indicated via the relayed postponement indication transmitted, at 612, to the second UE 603. In the diagrams 700-800, relay UE 706/806 may monitor for the downlink traffic at the postponed resources. The monitoring, at 1106, may be performed by the monitor component 1746 of the apparatus 1702 in FIG. 17.

Figure 12:
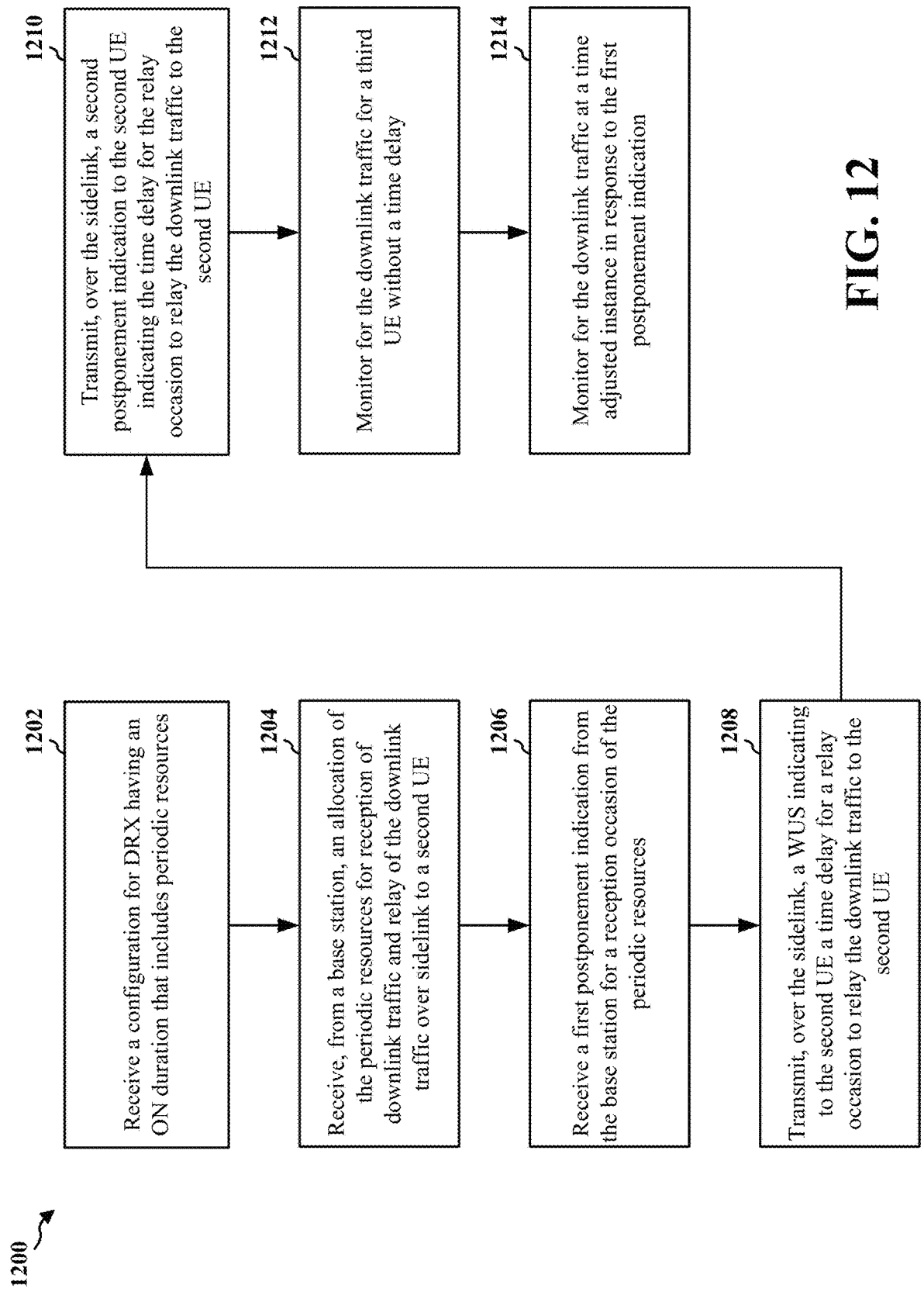
FIG. 12 is a flowchart of a method of wireless communication at a first UE.

FIG. 12 is a flowchart 1200 of a method of wireless communication. The method may be performed by a first UE (e.g., the UE 104, 406, 506, 602, 706, 806, 1006; the apparatus 1702; etc.), which may include the memory 360 and which may be the entire UE 104, 406, 506, 602, 706, 806, 1006 or a component of the UE 104, 406, 506, 602, 706, 806, 1006, such as the TX processor 368, the RX processor 356, and/or the controller/processor 359. The method may be performed to reduce resource waste associated with periodic resources.

At 1202, the first UE may receive a configuration for DRX having an ON duration that includes periodic resources. For example, referring to FIGS. 6 and 10, the first UE 602 may receive, at 606, a DRX configuration from the base station 604. As illustrated in the diagram 1000, the DRX configuration may include a Uu ON duration and a sidelink ON duration associated with periodic resources. The reception, at 1202, may be performed by the DRX component 1740 of the apparatus 1702 in FIG. 17.

At 1204, the first UE may receive, from a base station, an allocation of the periodic resources for reception of downlink traffic and relay of the downlink traffic over sidelink to a second UE. For example, referring to FIGS. 5-8, the first UE 602 may receive, at 606, an allocation of periodic resources from the base station 604, such that the first UE 602 may receive downlink traffic (e.g., at 620) from the base station 604 and relay (e.g. at 622) the downlink traffic to the second UE 603. In the diagrams 500 and 700-800, the second set of periodic resources (e.g., 510*b*) may be allocated to the relay UE 506, 706, 806 by the base station 504, 704, 804. The reception, at 1204, may be performed by the allocation component 1742 of the apparatus 1702 in FIG. 17.

At 1206, the first UE may receive a first postponement indication from the base station for a reception occasion of the periodic resources. For example, referring to FIGS. 6-8, the first UE 602 may receive, at 610, a postponement indication from the base station 604. In the diagrams 700-800, the relay UE 706/806 may receive the postponement signal 710/810 from the base station 704/804. The reception, at 1206, may be performed by the postponement component 1744 of the apparatus 1702 in FIG. 17.

At 1208, the first UE may transmit, over the sidelink, a WUS indicating to the second UE a time delay for a relay occasion to relay the downlink traffic to the second UE. For example, referring to FIGS. 6 and 10, the first UE 602 may transmit, at 612, a WUS indication for a time delay to the second UE 603. Based on the WUS indication transmitted, at 612, the first UE 602 may transmit, at 622, relayed/delayed downlink traffic to the second UE 603. In the diagram 1000, the relay UE may transmit a sidelink WUS 1002*b* associated with postponement information to the XR UE 1008. The transmission, at 1208, may be performed by the postponement component 1744 of the apparatus 1702 in FIG. 17.

At 1210, the first UE may transmit, over the sidelink, a second postponement indication to the second UE indicating the time delay for the relay occasion to relay the downlink traffic to the second UE. For example, referring to FIGS. 6-8, the first UE 602 may transmit, at 612, a relayed postponement indication to the second UE 603. Based on the relayed postponement indication transmitted, at 612, to the second UE 603, the first UE 602 may transmit, at 622, relayed/delayed downlink traffic to the second UE 603. In the diagrams 700-800, the relay UE 706/806 may forward the postponement signal 710/810 to the XR UE 708, 808*a,* 808*b.* The transmission, at 1210, may be performed by the postponement component 1744 of the apparatus 1702 in FIG. 17.

At 1212, the first UE may monitor for the downlink traffic for a third UE without a time delay. For example, referring to FIG. 6, the first UE 602 may monitor, at 614, for downlink traffic from a third UE without a time delay associated with the postponement indication. The monitoring, at 1212, may be performed by the monitor component 1746 of the apparatus 1702 in FIG. 17.

At 1214, the first UE may monitor for the downlink traffic at a time adjusted instance in response to the first postponement indication. For example, referring to FIG. 6, the first UE 602 may monitor, at 616, for downlink traffic at an adjusted time instance based on the time delay indicated via the relayed postponement indication transmitted, at 612, to the second UE 603. In the diagrams 700-800, relay UE 706/806 may monitor for the downlink traffic at the postponed resources. The monitoring, at 1214, may be performed by the monitor component 1746 of the apparatus 1702 in FIG. 17.

Figure 13:
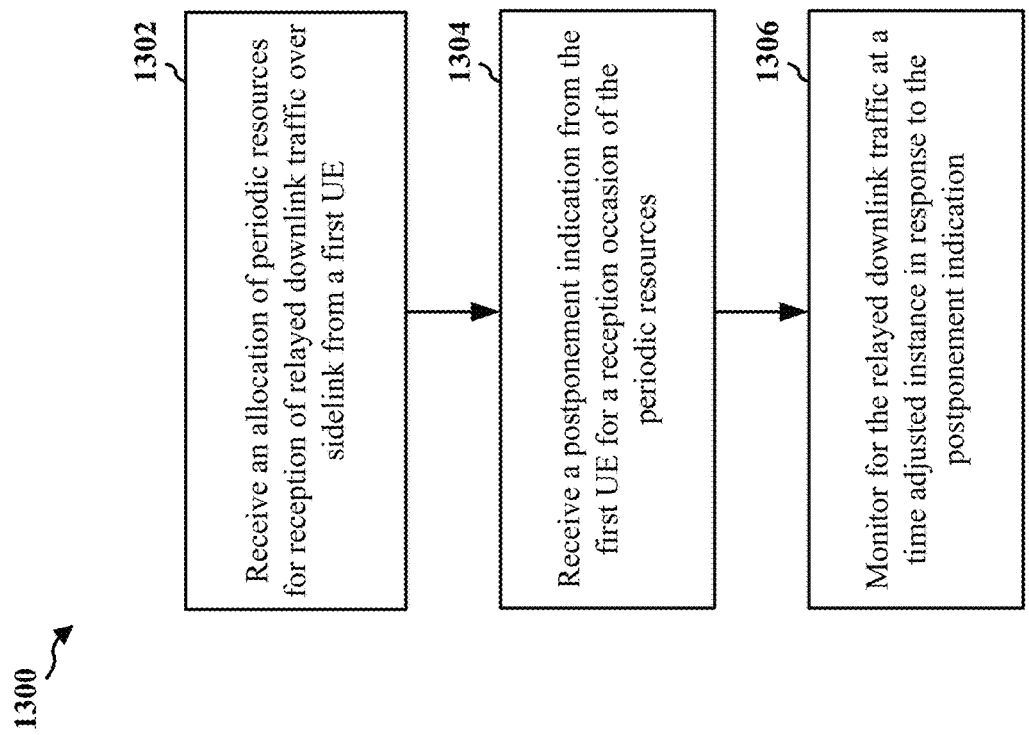
FIG. 13 is a flowchart of a method of wireless communication at a second UE.

FIG. 13 is a flowchart 1300 of a method of wireless communication. The method may be performed by a second UE (e.g., the UE 104, 408*a*-408*b,* 508, 603, 708, 808*a*-808*b,* 1008; the apparatus 1702; etc.), which may include the memory 360 and which may be the entire UE 104, 408*a*-408*b,* 508, 603, 708, 808*a*-808*b,* 1008 or a component of the UE 104, 408*a*-408*b,* 508, 603, 708, 808*a*-808*b,* 1008, such as the TX processor 368, the RX processor 356, and/or the controller/processor 359. The method may be performed to reduce resource waste associated with periodic resources.

At 1302, the second UE may receive an allocation of periodic resources for reception of relayed downlink traffic over sidelink from a first UE. For example, referring to FIGS. 5-8, the second UE 603 may receive, at 608, a relayed allocation of periodic resources from the base station 604 via the first UE 602 for receiving relayed downlink traffic (e.g., at 622) from the first UE 602. In the diagrams 500 and 700-800, the XR UE 508, 708, 808*a*, 808*b* may receive an allocation of a third set of periodic resources (e.g., 510*c*). The reception, at 1302, may be performed by the allocation component 1742 of the apparatus 1702 in FIG. 17.

At 1304, the second UE may receive a postponement indication from the first UE for a reception occasion of the periodic resources. For example, referring to FIGS. 6-8, the second UE 603 may receive, at 612, a relayed postponement indication from the first UE 602, which may correspond to a WUS indication of a time delay. Based on the relayed postponement indication received, at 612, from the first UE 602, the second UE 603 may receive, at 622, relayed/delayed downlink traffic from the first UE 602. In the diagrams 700-800, the XR UE 708, 808*a*, 808*b* may receive the postponement signal 710/810 from the relay UE 706/806. The reception, at 1304, may be performed by the postponement component 1744 of the apparatus 1702 in FIG. 17.

At 1306, the second UE may monitor for the relayed downlink traffic at a time adjusted instance in response to the postponement indication. For example, referring to FIG. 6, the second UE 603 may monitor, at 618, for relayed downlink traffic at an adjusted time instance based on the time delay indicated via the relayed postponement indication received, at 612, from the first UE 602. In the diagrams 700-800, the XR UE 708, 808*a*, 808*b* may monitor for the downlink traffic at the postponed resources. The monitoring, at 1306, may be performed by the monitor component 1746 of the apparatus 1702 in FIG. 17.

Figure 14:
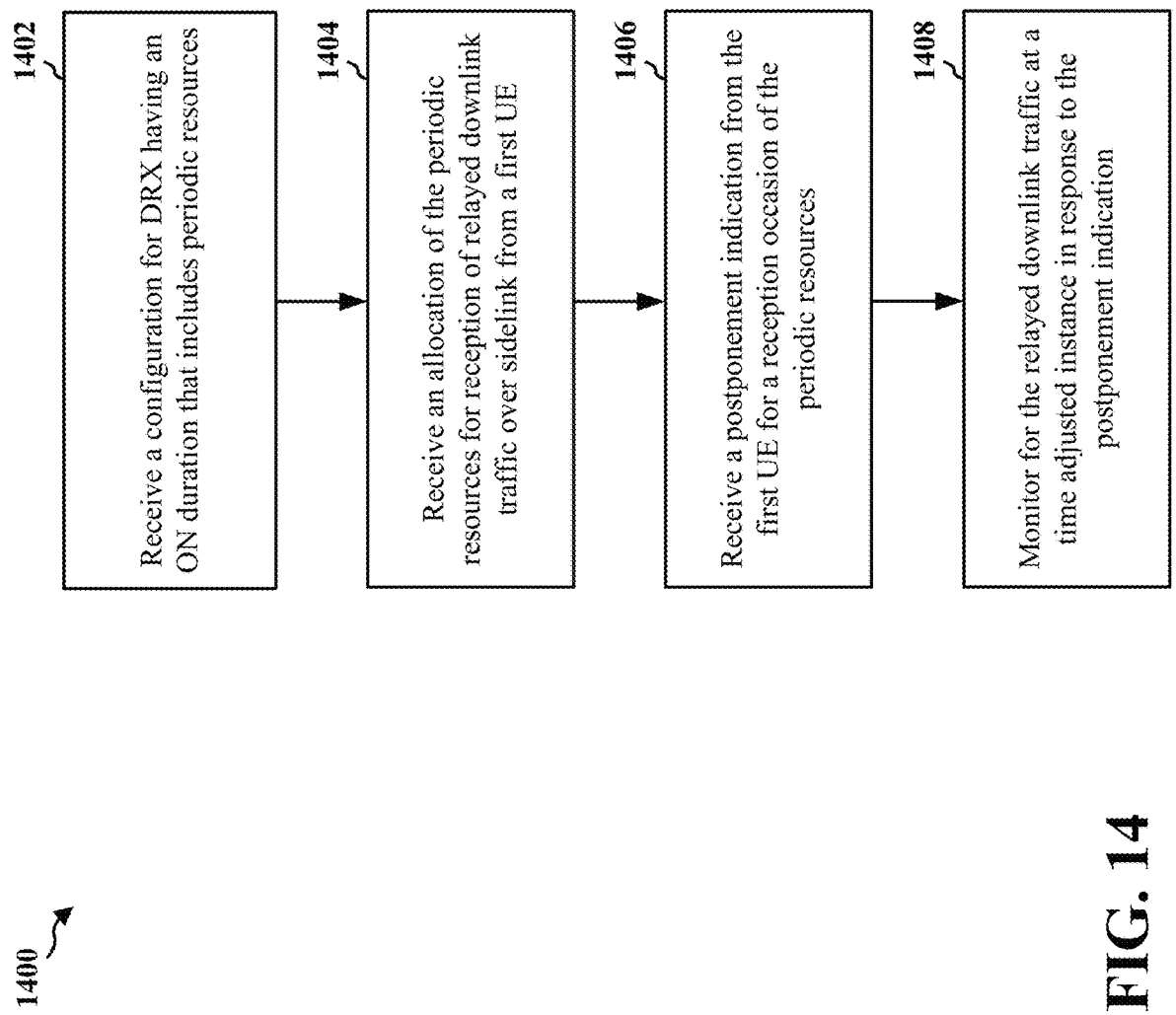
FIG. 14 is a flowchart of a method of wireless communication at a second UE.

FIG. 14 is a flowchart 1400 of a method of wireless communication. The method may be performed by a second UE (e.g., the UE 104, 408*a*-408*b*, 508, 603, 708, 808*a*-808*b*, 1008; the apparatus 1702; etc.), which may include the memory 360 and which may be the entire UE 104, 408*a*-408*b*, 508, 603, 708, 808*a*-808*b*, 1008 or a component of the UE 104, 408*a*-408*b*, 508, 603, 708, 808*a*-808*b*, 1008, such as the TX processor 368, the RX processor 356, and/or the controller/processor 359. The method may be performed to reduce resource waste associated with periodic resources.

At 1402, the second UE may receive a configuration for DRX having an ON duration that includes periodic resources. For example, referring to FIGS. 6 and 10, the second UE 603 may receive, at 608, a relayed DRX configuration from the first UE 602. As illustrated in the diagram 1000, the DRX configuration may include a Uu ON duration and a sidelink ON duration associated with periodic resources. The reception, at 1402, may be performed by the DRX component 1740 of the apparatus 1702 in FIG. 17.

At 1404, the second UE may receive an allocation of the periodic resources for reception of relayed downlink traffic over sidelink from a first UE. For example, referring to FIGS. 5-8, the second UE 603 may receive, at 608, a relayed allocation of periodic resources from the base station 604 via the first UE 602 for receiving relayed downlink traffic (e.g., at 622) from the first UE 602. In the diagrams 500 and 700-800, the XR UE 508, 708, 808*a*, 808*b* may receive an allocation of a third set of periodic resources (e.g., 510*c*). The reception, at 1404, may be performed by the allocation component 1742 of the apparatus 1702 in FIG. 17.

At 1406, the second UE may receive a postponement indication from the first UE for a reception occasion of the periodic resources. For example, referring to FIGS. 6 and 7-8, the second UE 603 may receive, at 612, a relayed postponement indication from the first UE 602, which may correspond to a WUS indication of a time delay. Based on the relayed postponement indication received, at 612, from the first UE 602, the second UE 603 may receive, at 622, relayed/delayed downlink traffic from the first UE 602. In the diagrams 700-800, the XR UE 708, 808*a*, 808*b* may receive the postponement signal 710/810 from the relay UE 706/806. The reception, at 1406, may be performed by the postponement component 1744 of the apparatus 1702 in FIG. 17.

At 1408, the second UE may monitor for the relayed downlink traffic at a time adjusted instance in response to the postponement indication. For example, referring to FIG. 6, the second UE 603 may monitor, at 618, for relayed downlink traffic at an adjusted time instance based on the time delay indicated via the relayed postponement indication received, at 612, from the first UE 602. In the diagrams 700-800, the XR UE 708, 808*a*, 808*b* may monitor for the downlink traffic at the postponed resources. The monitoring, at 1408, may be performed by the monitor component 1746 of the apparatus 1702 in FIG. 17.

Figure 15:
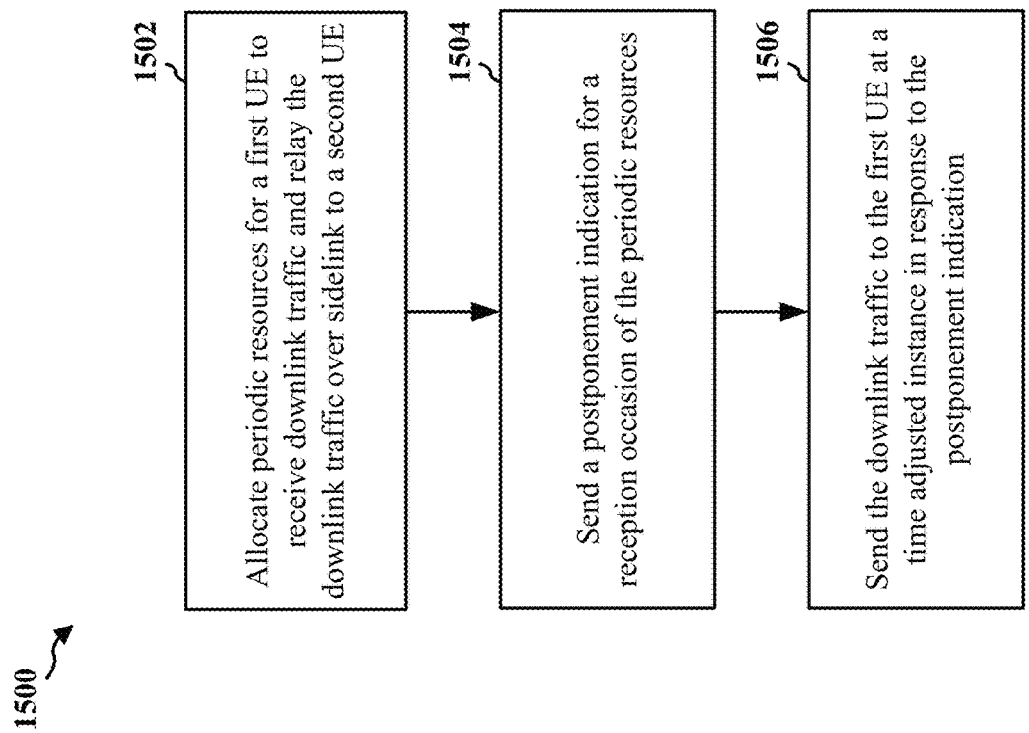
FIG. 15 is a flowchart of a method of wireless communication at a network node.

FIG. 15 is a flowchart 1500 of a method of wireless communication. The method may be performed by a network node (e.g., the base station 102, 404, 504, 604, 704, 804, 1004; the apparatus 1802; etc.), which may include the memory 376 and which may be the entire base station 102, 404, 504, 604, 704, 804, 1004 or a component of the base station 102, 404, 504, 604, 704, 804, 1004, such as the TX processor 316, the RX processor 370, and/or the controller/processor 375. The method may be performed to reduce resource waste associated with periodic resources.

At 1502, the network node may allocate periodic resources for a first UE to receive downlink traffic and relay the downlink traffic over sidelink to a second UE. For example, referring to FIGS. 5-8, the base station 604 may allocate, at 606, periodic resources to the first UE 602, which may relay downlink traffic (e.g., at 622) to the second UE 603. In the diagrams 500 and 700-800, the base station 504, 704, 804 may allocate the second set of periodic resources (e.g., 510*b*) to the relay UE 506, 706, 806. The allocation, at 1502, may be performed by the allocation component 1842 of the apparatus 1802 in FIG. 18.

At 1504, the network node may send a postponement indication for a reception occasion of the periodic resources. For example, referring to FIGS. 6-8, the base station 604 may transmit, at 610, a postponement indication to the first UE 602. In the diagrams 700-800, the base station 704/804 may transmit the postponement signal 710/810 to the relay UE 706/806. The sending, at 1504, may be performed by the postponement component 1844 of the apparatus 1802 in FIG. 18.

At 1506, the network node may send the downlink traffic to the first UE at a time adjusted instance in response to the postponement indication. For example, referring to FIGS. 6-8, the base station 604 may transmit, at 620, delayed downlink traffic to the first UE 602 based on the postponement indication transmitted, at 610, to the first UE 602. In the diagrams 700-800, the delayed downlink traffic may correspond to XR packets transmitted at the postponed periodic resources. The sending, at 1506, may be performed by the postponement component 1844 of the apparatus 1802 in FIG. 18.

Figure 16:
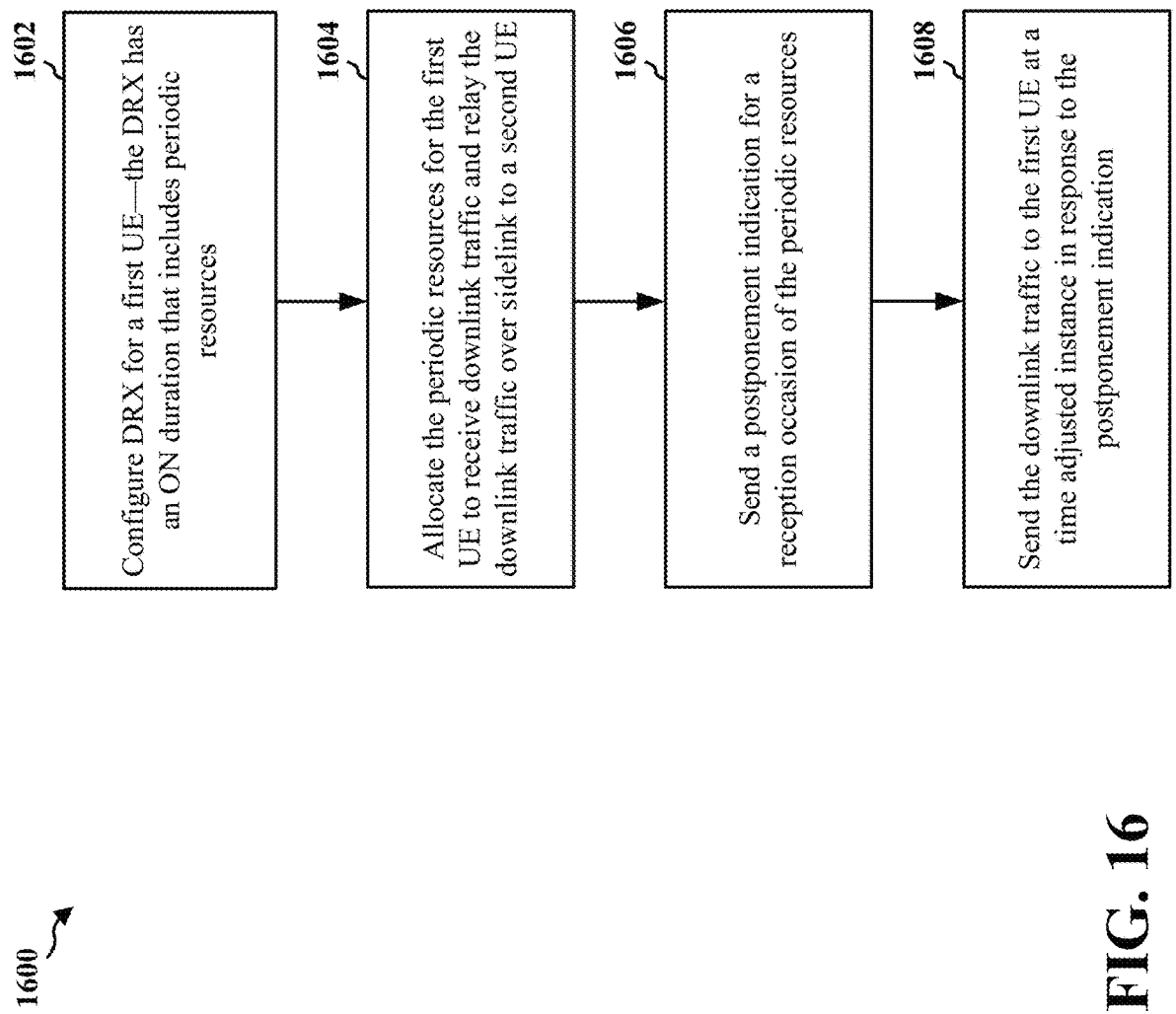
FIG. 16 is a flowchart of a method of wireless communication at a network node.

FIG. 16 is a flowchart 1600 of a method of wireless communication. The method may be performed by a network node (e.g., the base station 102, 404, 504, 604, 704, 804, 1004; the apparatus 1802; etc.), which may include the memory 376 and which may be the entire base station 102, 404, 504, 604, 704, 804, 1004 or a component of the base station 102, 404, 504, 604, 704, 804, 1004, such as the TX processor 316, the RX processor 370, and/or the controller/processor 375. The method may be performed to reduce resource waste associated with periodic resources.

At 1602, the network node may configure DRX for a first UE—the DRX has an ON duration that includes periodic resources. For example, referring to FIGS. 6 and 10, the base station 604 may transmit, at 606, a DRX configuration to the first UE 602. As illustrated in the diagram 1000, the DRX configuration may include a Uu ON duration and a sidelink ON duration associated with periodic resources. The configuration, at 1602, may be performed by the configuration component 1840 of the apparatus 1802 in FIG. 18.

At 1604, the network node may allocate the periodic resources for the first UE to receive downlink traffic and relay the downlink traffic over sidelink to a second UE. For example, referring to FIGS. 5-8, the base station 604 may allocate, at 606, periodic resources to the first UE 602, which may relay downlink traffic (e.g., at 622) to the second UE 603. In the diagrams 500 and 700-800, the base station 504, 704, 804 may allocate the second set of periodic resources (e.g., 510b) to the relay UE 506, 706, 806. The allocation, at 1604, may be performed by the allocation component 1842 of the apparatus 1802 in FIG. 18.

At 1606, the network node may send a postponement indication for a reception occasion of the periodic resources. For example, referring to FIGS. 6-8, the base station 604 may transmit, at 610, a postponement indication to the first UE 602. In the diagrams 700-800, the base station 704/804 may transmit the postponement signal 710/810 to the relay UE 706/806. The sending, at 1606, may be performed by the postponement component 1844 of the apparatus 1802 in FIG. 18.

At 1608, the network node may send the downlink traffic to the first UE at a time adjusted instance in response to the postponement indication. For example, referring to FIGS. 6-8, the base station 604 may transmit, at 620, delayed downlink traffic to the first UE 602 based on the postponement indication transmitted, at 610, to the first UE 602. In the diagrams 700-800, the delayed downlink traffic may correspond to XR packets transmitted at the postponed periodic resources. The sending, at 1608, may be performed by the postponement component 1844 of the apparatus 1802 in FIG. 18.

Figure 17:
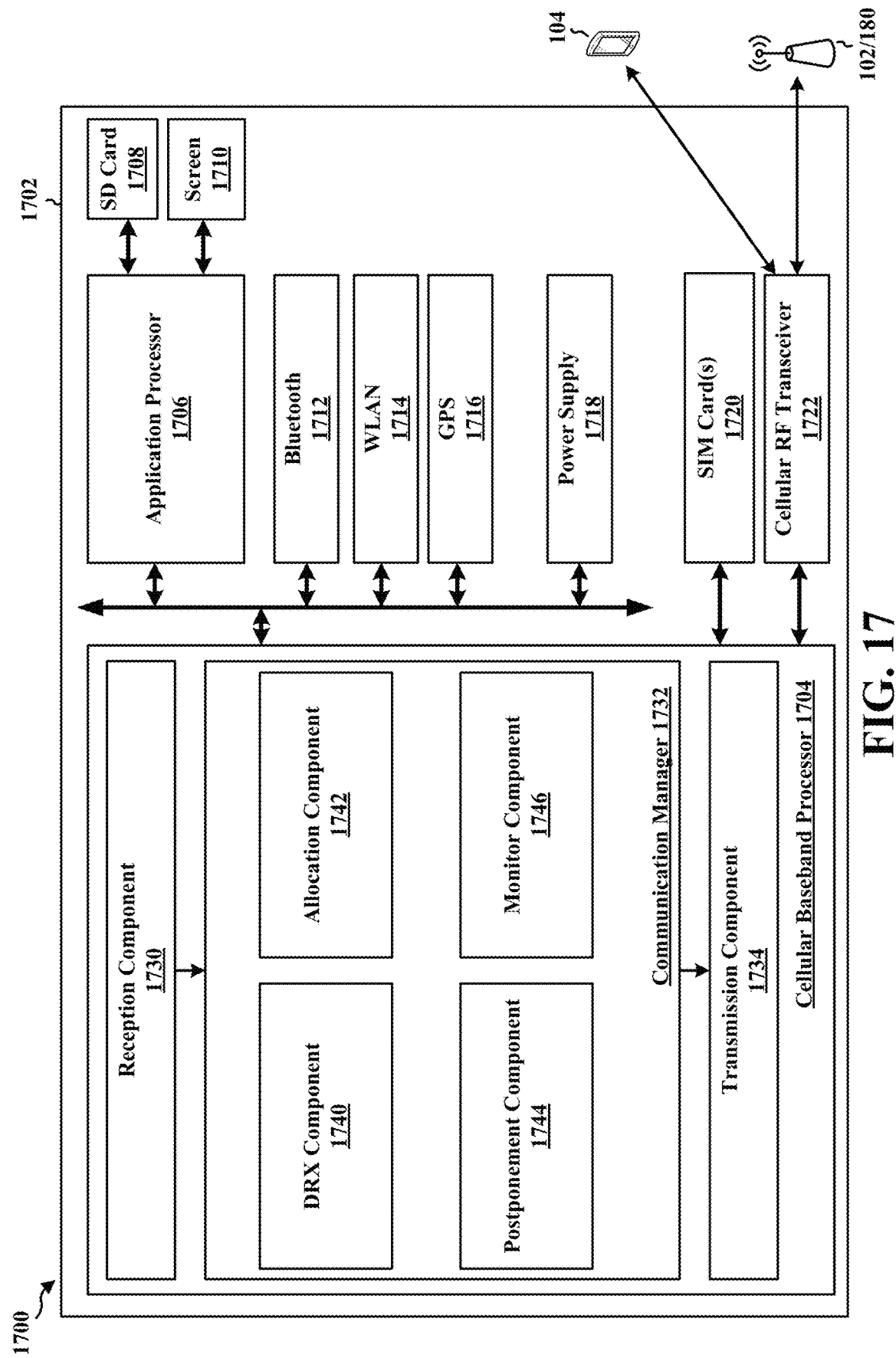
FIG. 17 is a diagram illustrating an example of a hardware implementation for an example apparatus.

FIG. 17 is a diagram 1700 illustrating an example of a hardware implementation for an apparatus 1702. The apparatus 1702 may be a UE, a component of a UE, or may implement UE functionality. In some aspects, the apparatus 1702 may include a cellular baseband processor 1704 (also referred to as a modem) coupled to a cellular RF transceiver 1722. In some aspects, the apparatus 1702 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the device 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the additional modules of the apparatus 1702.

The communication manager 1732 includes a DRX component 1740 that is configured, e.g., as described in connection with 1202, 1208, and 1402, to receive a configuration for DRX having an ON duration that includes periodic resources; to transmit, over the sidelink, a WUS indicating to the second UE a time delay for a relay occasion to relay the downlink traffic to the second UE; and to receive a configuration for DRX having an ON duration that includes periodic resources. The communication manager 1732 further includes an allocation component 1742 that is configured, e.g., as described in connection with 1102, 1204, 1302, and 1404, to receive, from a base station, an allocation of the periodic resources for reception of downlink traffic and relay of the downlink traffic over sidelink to a second UE; and to receive an allocation of the periodic resources for reception of relayed downlink traffic over sidelink from a first UE. The communication manager 1732 further includes a postponement component 1744 that is configured, e.g., as described in connection with 1104, 1206, 1210, 1304, and 1406, to receive a first postponement indication from the base station for a reception occasion of the periodic resources; to transmit, over the sidelink, a second postponement indication to the second UE indicating the time delay for the relay occasion to relay the downlink traffic to the second UE; and to receive a postponement indication from the first UE for a reception occasion of the periodic resources. The communication manager 1732 further includes a monitor component 1746 that is configured, e.g., as described in connection with 1106, 1212, 1214, 1306, and 1408, to monitor for the downlink traffic for a third UE without a time delay; to monitor for the downlink traffic at a time adjusted instance in response to the first postponement indication; and to monitor for the relayed downlink traffic at a time adjusted instance in response to the postponement indication.

The apparatus may include additional components that perform each of the blocks of the algorithm in the flowcharts of FIGS. 11-14. As such, each block in the flowcharts of FIGS. 11-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In a first configuration, the apparatus 1702, and in particular the cellular baseband processor 1704, includes means for receiving, from a base station, an allocation of periodic resources for reception of downlink traffic and relay of the downlink traffic over sidelink to a second UE; means for receiving a first postponement indication from the base station for a reception occasion of the periodic resources; and means for monitoring for the downlink traffic at a time adjusted instance in response to the first postponement indication. The apparatus 1702 further includes means for transmitting, over the sidelink, a second postponement indication to the second UE indicating a time delay for a relay occasion to relay the downlink traffic to the second UE. The apparatus 1702 further includes means for monitoring for the downlink traffic for the third UE without a time delay. The apparatus 1702 further includes means for receiving a configuration for DRX having an ON duration that comprises the periodic resources, where the first postponement indication is received in a first WUS, and where the time adjusted instance comprises a time adjusted ON duration. The apparatus 1702 further includes means for transmitting, over the sidelink, a second WUS indicating to the second UE indicating a time delay for a relay occasion to relay the downlink traffic to the second UE.

In a second configuration, the apparatus 1702, and in particular the cellular baseband processor 1704, includes means for receiving an allocation of periodic resources for reception of relayed downlink traffic over sidelink from a first UE; means for receiving a postponement indication from the first UE for a reception occasion of the periodic resources; and means for monitoring for the relayed downlink traffic at a time adjusted instance in response to the postponement indication. The apparatus 1702 further includes means for receiving a configuration for DRX having an ON duration that comprises the periodic resources, where the postponement indication is received in a WUS, and where the time adjusted instance comprises a time adjusted ON duration.

The means may be one or more of the components of the apparatus 1702 configured to perform the functions recited by the means. As described supra, the apparatus 1702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 18:
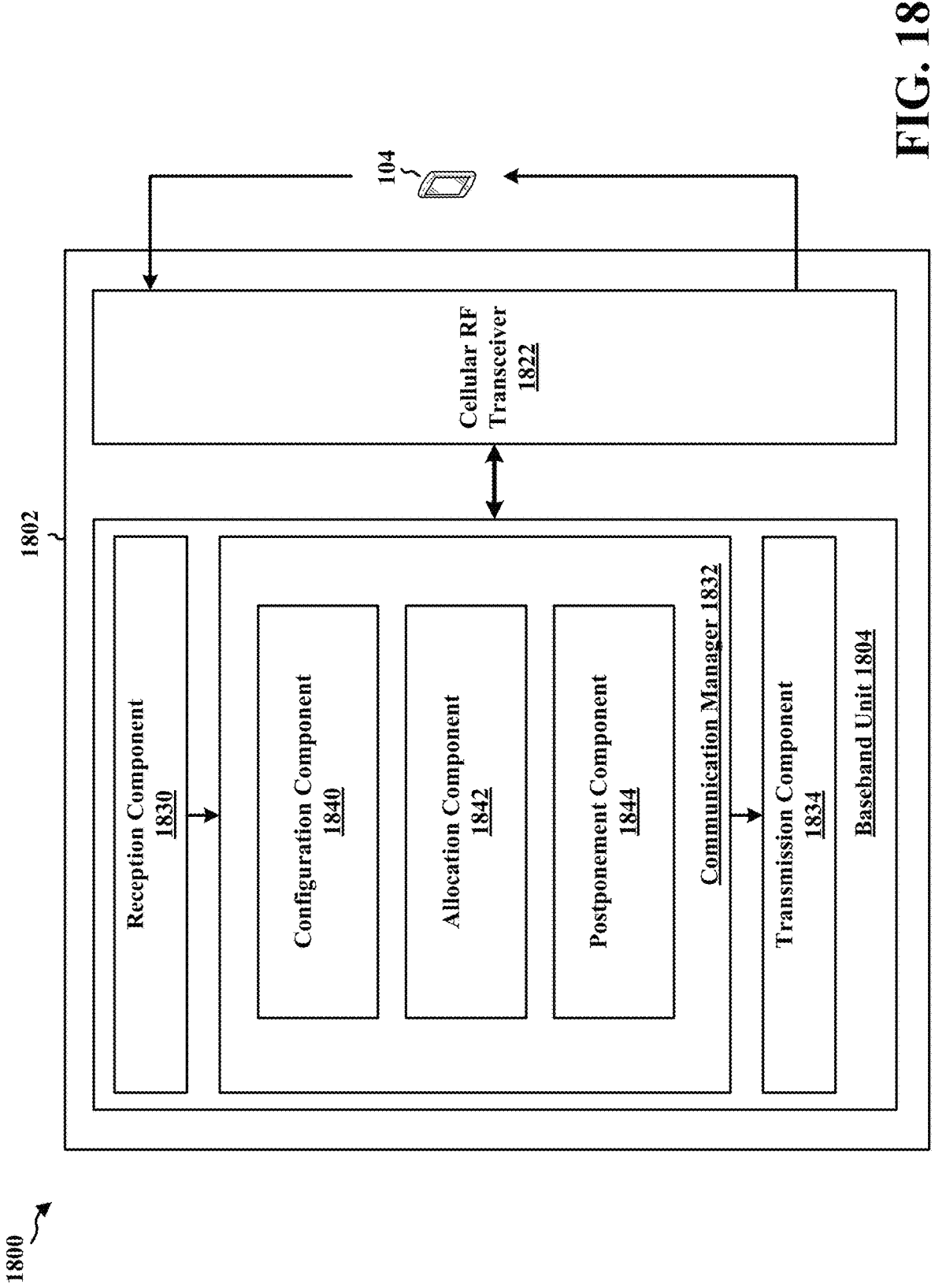
FIG. 18 is a diagram illustrating an example of a hardware implementation for an example apparatus.

FIG. 18 is a diagram 1800 illustrating an example of a hardware implementation for an apparatus 1802. The apparatus 1802 may be a base station, a component of a base station, or may implement base station functionality. In some aspects, the apparatus 1802 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the device 310 and may include the memory 376 and/or at least one of the TX processor 316, the RX processor 370, and the controller/processor 375.

The communication manager 1832 includes a configuration component 1840 that is configured, e.g., as described in connection with 1602, to configure DRX for a first UE—the DRX has an ON duration that includes periodic resources. The communication manager 1832 further includes an allocation component 1842 that is configured, e.g., as described in connection with 1502 and 1604, to allocate the periodic resources for the first UE to receive downlink traffic and relay the downlink traffic over sidelink to a second UE. The communication manager 1832 further includes a postponement component 1844 that is configured, e.g., as described in connection with 1504, 1506, 1606, and 1608, to send a postponement indication for a reception occasion of the periodic resources; and to send the downlink traffic to the first UE at a time adjusted instance in response to the postponement indication.

The apparatus may include additional components that perform each of the blocks of the algorithm in the flowcharts of FIGS. 15-16. As such, each block in the flowcharts of FIGS. 15-16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for allocating periodic resources for a first UE to receive downlink traffic and relay the downlink traffic over sidelink to a second UE; means for sending a postponement indication for a reception occasion of the periodic resources; and means for sending the downlink traffic to the first UE at a time adjusted instance in response to the postponement indication. The apparatus 1802 further includes means for configuring DRX for the first UE, the DRX having an ON duration that comprises the periodic resources, where the postponement indication is comprised in a WUS, and where the time adjusted instance comprises a time adjusted ON duration.

The means may be one or more of the components of the apparatus 1802 configured to perform the functions recited by the means. As described supra, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to: receive, from a base station, an allocation of periodic resources for reception of downlink traffic and relay of the downlink traffic over sidelink to a second UE; receive a first postponement indication from the base station for a reception occasion of the periodic resources; and monitor for the downlink traffic at a time adjusted instance in response to the first postponement indication.

Aspect 2 may be combined with aspect 1 and includes that the at least one processor is further configured to transmit, over the sidelink, a second postponement indication to the second UE indicating a time delay for a relay occasion to relay the downlink traffic to the second UE.

Aspect 3 may be combined with any of aspects 1-2 and includes that the first postponement indication corresponds to a single reception occasion of the periodic resources.

Aspect 4 may be combined with any of aspects 1-3 and includes that the first postponement indication corresponds to each subsequent reception occasion of the periodic resources.

Aspect 5 may be combined with any of aspects 1-4 and includes that the time adjusted instance includes a time delay after the reception occasion.

Aspect 6 may be combined with any of aspects 1-5 and includes that the time adjusted instance includes a time advance before a subsequent reception occasion.

Aspect 7 may be combined with any of aspects 1-6 and includes that the first postponement indication indicates a change to the allocation of the periodic resources.

Aspect 8 may be combined with any of aspects 1-7 and includes that the time adjusted instance includes an extension to one or more subsequent reception occasions.

Aspect 9 may be combined with any of aspects 1-8 and includes that the allocation further includes the periodic resources for the reception of the downlink traffic and sidelink relay of the downlink traffic to a third UE, where the first postponement indication from the base station is for the downlink traffic to be relayed to at least one of the second UE or the third UE.

Aspect 10 may be combined with any of aspects 1-9 and includes that the first postponement indication from the base station is for the downlink traffic to be relayed to the second UE, and that the at least one processor is further configured to monitor for the downlink traffic for the third UE without a time delay.

Aspect 11 may be combined with any of aspects 1-10 and includes that the at least one processor is further configured to receive a configuration for DRX having an ON duration that includes the periodic resources, where the first postponement indication is received in a first WUS, and where the time adjusted instance includes a time adjusted ON duration.

Aspect 12 may be combined with any of aspects 1-11 and includes that the at least one processor is further configured to transmit, over the sidelink, a second WUS indicating to the second UE indicating a time delay for a relay occasion to relay the downlink traffic to the second UE.

Aspect 13 may be combined with any of aspects 1-12 and includes that the first WUS indicates one or more of a first time delay for a single ON duration, a second time delay for each subsequent ON duration, a third time delay after the ON duration, a time advance before a subsequent ON duration, a change to the configuration of the ON duration, or an extension to one or more subsequent ON durations.

Aspect 14 is an apparatus for wireless communication at a second UE including at least one processor coupled to a memory and configured to: receive an allocation of periodic resources for reception of relayed downlink traffic over sidelink from a first UE; receive a postponement indication from the first UE for a reception occasion of the periodic resources; and monitor for the relayed downlink traffic at a time adjusted instance in response to the postponement indication.

Aspect 15 may be combined with aspect 14 and includes that the postponement indication indicates one or more of: a first time adjustment for a single reception occasion of the periodic resources, a second time adjustment for each subsequent reception occasion of the periodic resources, a time delay after the reception occasion, a time advance before a subsequent reception occasion, a change to the allocation of the periodic resources, or an extension to one or more subsequent reception occasions.

Aspect 16 may be combined with aspect 15 and includes that the at least one processor is further configured to receive a configuration for DRX having an ON duration that includes the periodic resources, where the postponement indication is received in a WUS, and where the time adjusted instance includes a time adjusted ON duration.

Aspect 17 may be combined with any of aspects 15-16 and includes that the WUS indicates one or more of: a time delay for a single ON duration, a time delay for each subsequent ON duration, a time delay after the ON duration, a time advance before a subsequent ON duration, a change to a DRX configuration of the ON duration, or an extension to one or more subsequent ON durations.

Aspect 18 is an apparatus for wireless communication at a network node including at least one processor coupled to a memory and configured to: allocate periodic resources for a first UE to receive downlink traffic and relay the downlink traffic over sidelink to a second UE; send a postponement indication for a reception occasion of the periodic resources; and send the downlink traffic to the first UE at a time adjusted instance in response to the postponement indication.

Aspect 19 may be combined with aspect 18 and includes that the postponement indication indicates one or more of: a first time adjustment for a single reception occasion of the periodic resources, a first time adjustment for each subsequent reception occasion of the periodic resources, a time delay after the reception occasion, a time advance before a subsequent reception occasion, a change to the periodic resources, or an extension to one or more subsequent reception occasions.

Aspect 20 may be combined with any of aspect 18-19 and includes that the at least one processor is further configured to configure DRX for the first UE, the DRX having an ON duration that includes the periodic resources, where the postponement indication is included in a WUS, and where the time adjusted instance includes a time adjusted ON duration.

Aspect 21 may be combined with any of aspect 18-20 and includes that the WUS indicates one or more of: a first time delay for a single ON duration, a second time delay for each subsequent ON duration, a third time delay after the ON duration, a time advance before a subsequent ON duration, a change to a DRX configuration of the ON duration, or an extension to one or more subsequent ON durations.

Aspect 22 may be combined with any of aspects 1-21 and further includes at least one of an antenna or a transceiver coupled to the at least one processor.

Aspect 23 is a method of wireless communication for implementing any of aspects 1-22.

Aspect 24 is an apparatus for wireless communication including means for implementing any of aspects 1-22.

Aspect 25 is a non-transitory computer-readable medium storing computer executable code, the code when executed by at least one processor causes the at least one processor to implement any of aspects 1-22.

What is claimed is:

1. An apparatus for wireless communication at a first user equipment (UE), comprising:
a memory; and
at least one processor coupled to the memory and configured to:
receive, from a base station, an allocation of periodic resources for reception of downlink traffic and relay of the downlink traffic over sidelink to a second UE;
receive a first postponement indication from the base station for a reception occasion of the periodic resources, wherein the first postponement indication is based on a delay of an arrival of data for the downlink traffic at the base station, and wherein the first postponement indication indicates a postponement of a next allocated instance of the periodic resources at both the first UE and the second UE, and wherein the postponement corresponds to the delay of the arrival of the data for the downlink traffic at the base station; and
monitor for the downlink traffic at a time adjusted instance in response to the first postponement indication.

2. The apparatus of claim 1, wherein the at least one processor is further configured to transmit, over the sidelink, a second postponement indication to the second UE indicating a time delay for a relay occasion to relay the downlink traffic to the second UE.

3. The apparatus of claim 1, wherein the first postponement indication corresponds to a single reception occasion of the periodic resources.

4. The apparatus of claim 1, wherein the first postponement indication corresponds to each subsequent reception occasion of the periodic resources.

5. The apparatus of claim 1, wherein the time adjusted instance comprises a time delay after the reception occasion.

6. The apparatus of claim 1, wherein the time adjusted instance comprises a time advance before a subsequent reception occasion.

7. The apparatus of claim 1, wherein the first postponement indication indicates a change to the allocation of the periodic resources.

8. The apparatus of claim 1, wherein the time adjusted instance comprises an extension to one or more subsequent reception occasions.

9. The apparatus of claim 1, wherein the allocation further includes the periodic resources for the reception of the downlink traffic and sidelink relay of the downlink traffic to a third UE, wherein the first postponement indication from the base station is for the downlink traffic to be relayed to at least one of the second UE or the third UE.

10. The apparatus of claim 9, wherein the first postponement indication from the base station is for the downlink traffic to be relayed to the second UE, the at least one processor further configured to monitor for the downlink traffic for the third UE without a time delay.

11. The apparatus of claim 1, wherein the at least one processor is further configured to receive a configuration for discontinuous reception (DRX) having an ON duration that comprises the periodic resources, wherein the first postponement indication is received in a first wake-up signal (WUS), and wherein the time adjusted instance comprises a time adjusted ON duration.

12. The apparatus of claim 11, wherein the at least one processor is further configured to transmit, over the sidelink, a second WUS indicating, to the second UE, a time delay for a relay occasion to relay the downlink traffic to the second UE.

13. The apparatus of claim 11, wherein the first WUS indicates one or more of:
a first time delay for a single ON duration,
a second time delay for each subsequent ON duration,
a third time delay after the ON duration,
a time advance before a subsequent ON duration,
a change to the configuration of the ON duration, or
an extension to one or more subsequent ON durations.

14. An apparatus for wireless communication at a second user equipment (UE), comprising:
a memory; and
at least one processor coupled to the memory and configured to:
receive an allocation of periodic resources for reception of relayed downlink traffic over sidelink from a first UE;
receive a postponement indication from the first UE for a reception occasion of the periodic resources, wherein the postponement indication is based on a delay of an arrival of data for the relayed downlink traffic, wherein the postponement indication indicates a postponement of a next allocated instance of the periodic resources at both the first UE and the second UE, and wherein the postponement corresponds to the delay of the arrival of the data for the relayed downlink traffic; and
monitor for the relayed downlink traffic at a time adjusted instance in response to the postponement indication.

15. The apparatus of claim 14, wherein the postponement indication indicates one or more of:
a first time adjustment for a single reception occasion of the periodic resources,
a second time adjustment for each subsequent reception occasion of the periodic resources,
a time delay after the reception occasion,
a time advance before a subsequent reception occasion,
a change to the allocation of the periodic resources, or
an extension to one or more subsequent reception occasions.

16. The apparatus of claim 14, wherein the at least one processor is further configured to receive a configuration for discontinuous reception (DRX) having an ON duration that comprises the periodic resources, wherein the postponement indication is received in a wake-up signal (WUS), and wherein the time adjusted instance comprises a time adjusted ON duration.

17. The apparatus of claim 16, wherein the WUS indicates one or more of:
a first time delay for a single ON duration,
a second time delay for each subsequent ON duration,
a third time delay after the ON duration,
a time advance before a subsequent ON duration,
a change to a DRX configuration of the ON duration, or
an extension to one or more subsequent ON durations.

18. An apparatus for wireless communication at a network node, comprising:
a memory; and
at least one processor coupled to the memory and configured to:
allocate periodic resources for a first user equipment (UE) to receive downlink traffic and relay the downlink traffic over sidelink to a second UE;
send a postponement indication for a reception occasion of the periodic resources, wherein the postponement indication is based on a delay of an arrival of data for the downlink traffic at the network node, wherein the postponement indication indicates a postponement of a next allocated instance of the periodic resources at both the first UE and the second UE, and wherein the postponement corresponds to the delay of the arrival of the data for the downlink traffic at the network node; and
send the downlink traffic to the first UE at a time adjusted instance in response to the postponement indication.

19. The apparatus of claim 18, wherein the postponement indication indicates one or more of:
a first time adjustment for a single reception occasion of the periodic resources,
a second time adjustment for each subsequent reception occasion of the periodic resources,
a time delay after the reception occasion,
a time advance before a subsequent reception occasion,
a change to the periodic resources, or
an extension to one or more subsequent reception occasions.

20. The apparatus of claim 18, wherein the at least one processor is further configured to configure discontinuous reception (DRX) for the first UE, the DRX having an ON duration that comprises the periodic resources, wherein the postponement indication is comprised in a wake-up signal (WUS), and wherein the time adjusted instance comprises a time adjusted ON duration.

21. The apparatus of claim 20, wherein the WUS indicates one or more of:
a first time delay for a single ON duration,
a second time delay for each subsequent ON duration,
a third time delay after the ON duration,
a time advance before a subsequent ON duration,
a change to a DRX configuration of the ON duration, or
an extension to one or more subsequent ON durations.

22. A method of wireless communication at a first user equipment (UE), comprising:
receiving, from a base station, an allocation of periodic resources for reception of downlink traffic and relay of the downlink traffic over sidelink to a second UE;
receiving a first postponement indication from the base station for a reception occasion of the periodic resources, wherein the first postponement indication is based on a delay of an arrival of data for the downlink traffic at the base station, wherein the first postponement indication indicates a postponement of a next allocated instance of the periodic resources at both the first UE and the second UE, and wherein the postponement corresponds to the delay of the arrival of the data for the downlink traffic at the base station; and
monitoring for the downlink traffic at a time adjusted instance in response to the first postponement indication.

23. The method of claim 22, further comprising transmitting, over the sidelink, a second postponement indication to the second UE indicating a time delay for a relay occasion to relay the downlink traffic to the second UE.

24. The method of claim 22, wherein the first postponement indication corresponds to a single reception occasion of the periodic resources.

25. The method of claim 22, wherein the first postponement indication corresponds to each subsequent reception occasion of the periodic resources.

26. The method of claim 22, wherein the time adjusted instance comprises a time delay after the reception occasion.

27. The method of claim 22, wherein the time adjusted instance comprises a time advance before a subsequent reception occasion.

28. The method of claim 22, wherein the first postponement indication indicates a change to the allocation of the periodic resources.

29. The method of claim 22, wherein the time adjusted instance comprises an extension to one or more subsequent reception occasions.

30. The method of claim 22, wherein the allocation further includes the periodic resources for the reception of the downlink traffic and sidelink relay of the downlink traffic to a third UE, wherein the first postponement indication from the base station is for the downlink traffic to be relayed to at least one of the second UE or the third UE.

* * * * *